(12) United States Patent
Kim

(10) Patent No.: US 12,557,124 B2
(45) Date of Patent: Feb. 17, 2026

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventor: Young Dae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 403 days.

(21) Appl. No.: 18/008,620

(22) PCT Filed: Jun. 23, 2021

(86) PCT No.: PCT/KR2021/007884
§ 371 (c)(1),
(2) Date: Dec. 6, 2022

(87) PCT Pub. No.: WO2022/005094
PCT Pub. Date: Jan. 6, 2022

(65) Prior Publication Data
US 2023/0224931 A1    Jul. 13, 2023

(30) Foreign Application Priority Data

Jul. 3, 2020    (KR) .................. 10-2020-0082225

(51) Int. Cl.
*H04W 72/40* (2023.01)
*H04W 56/00* (2009.01)

(52) U.S. Cl.
CPC ......... *H04W 72/40* (2023.01); *H04W 56/002* (2013.01)

(58) Field of Classification Search
CPC .................................................. H04W 72/40
See application file for complete search history.

(56) References Cited

U.S. PATENT DOCUMENTS

2015/0334693 A1* 11/2015 Lu .................. H04W 72/20
370/329
2016/0295624 A1* 10/2016 Novlan .................. H04L 67/12
(Continued)

FOREIGN PATENT DOCUMENTS

JP         2020-17980 A    1/2020
KR   10-2020-0017388 A    2/2020
(Continued)

OTHER PUBLICATIONS

Huawei, HiSilicon, "Discussion on remaining MAC open issues for 5G V2X with NR SL", 3GPP TSG-RAN WG2 Meeting #110 electronic Jun. 1-12, 2020, R2-2005492, pp. 1-45.

*Primary Examiner* — Pamit Kaur
(74) *Attorney, Agent, or Firm* — BRYAN CAVE LEIGHTON PAISNER LLP

(57) ABSTRACT

Disclosed herein are an operating method of a first terminal in a wireless communication system and a device for supporting the method. According to an embodiment applicable to the present disclosure, the method may include performing, by the first terminal, a beam alignment with a second terminal and receiving, by the first terminal, downlink control information (DCI) associated with the second terminal from a base station. Herein, the DCI may be decoded based on at least one of a common radio network temporary identifier (RNTI), a sidelink-RNTI (SL-RNTI) of the second terminal, and a sidelink connection specific ID. In addition, the method may further include receiving, by the first terminal, a physical sidelink control channel (PSCCH) and a physical sidelink shared channel (PSSCH) from the second terminal based on the DCI.

16 Claims, 22 Drawing Sheets

(56) References Cited

U.S. PATENT DOCUMENTS

| | | | | |
|---|---|---|---|---|
| 2020/0396760 | A1* | 12/2020 | Yi | H04W 72/23 |
| 2021/0306824 | A1* | 9/2021 | Li | H04W 4/40 |
| 2021/0337512 | A1* | 10/2021 | Belleschi | H04W 72/02 |
| 2021/0352599 | A1* | 11/2021 | Kusashima | H04W 56/002 |
| 2022/0225143 | A1* | 7/2022 | Sun | H04W 72/542 |
| 2023/0050238 | A1* | 2/2023 | Ganesan | H04W 76/14 |

FOREIGN PATENT DOCUMENTS

| | | |
|---|---|---|
| KR | 10-2020-0078354 A | 7/2020 |
| WO | 2020/033622 A1 | 2/2020 |

\* cited by examiner

FIG. 11

METHOD AND APPARATUS FOR TRANSMITTING SIGNAL IN WIRELESS COMMUNICATION SYSTEM

CROSS-REFERENCE TO RELATED APPLICATION

This application is the National Stage filing under 35 U.S.C. 371 of International Application No. PCT/KR2021/007884, filed Jun. 23, 2021, which claims the benefit of Korean Patent Application No. 10-2020-0082225, filed Jul. 3, 2020, the contents of which are all hereby incorporated by reference herein in their entirety.

BACKGROUND

Field

The present disclosure relates to a wireless communication system and, more particularly, to a method and apparatus for transmitting an efficient discovery signal in a wireless communication system.

Description of the Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method for allocating a control resource in a wireless communication system.

The present disclosure relates to a method for allocating a control resource associated with mmWave sidelink.

The technical objects to be achieved in the present disclosure are not limited to the above-mentioned technical objects, and other technical objects that are not mentioned may be considered by those skilled in the art through the embodiments described below.

An example of the present disclosure may include performing, by a first terminal, a beam alignment with a second terminal and receiving, by the first terminal, downlink control information (DCI) associated with the second terminal from a base station. Herein, the DCI may be decoded based on at least one of a common radio network temporary identifier (RNTI), a sidelink-RNTI (SL-RNTI) of the second terminal, and a sidelink connection specific ID. In addition, receiving, by the first terminal, a physical sidelink control channel (PSCCH) and a physical sidelink shared channel (PSSCH) from the second terminal based on the DCI may further be included.

In addition, based on the beam alignment, the first terminal may receive the SL-RNTI of the second terminal from the second terminal. Herein, the DCI may be decoded based on the SL-RNTI of the second terminal. Herein, the DCI may include a destination ID field.

In addition, the first terminal may transmit sidelink unicast connection information associated with the beam alignment to the base station. Herein, the DCI may be decoded based on a sidelink connection specific ID associated with the beam alignment.

In addition, the DCI may be decoded based on the common RNTI. Herein, the DCI may include a source ID field and a destination ID field.

An example of the present disclosure may include performing, by a second terminal, a beam alignment with a first terminal, transmitting, by the second terminal, a sidelink scheduling request (SL-SR) and a sidelink buffer status report (SL-BSR) to a base station, and receiving, by the second terminal, downlink control information (DCI) associated with the second terminal from the base station. Herein, the DCI may be decoded based on at least one of a common radio network temporary identifier (RNTI), a sidelink-RNTI (SL-RNTI) of the second terminal, and a sidelink connection specific ID. In addition, transmitting, by the second terminal, a physical sidelink control channel (PSCCH) and a physical sidelink shared channel (PSSCH) to the first terminal based on the DCI may further be included.

In addition, based on the beam alignment, the second terminal may transmit the SL-RNTI of the second terminal to the first terminal. Herein, the DCI may be decoded based on the SL-RNTI of the second terminal. Herein, the DCI may include a destination ID field.

In addition, the second terminal may transmit sidelink unicast connection information associated with the beam alignment to the base station. Herein, the DCI may be decoded based on the sidelink connection specific ID associated with the beam alignment.

In addition, the DCI may be decoded based on the common RNTI. Herein, the DCI may include a source ID field and a destination ID field.

In addition, a media access control element (MAC CE) of the SL-BSR may include location information of the second terminal and transmission direction information of the second terminal. Herein, the location information of the second terminal may be based on a zone ID.

As an example of the present disclosure, a first terminal may include a transceiver and a processor coupled with the transceiver. The processor may control to perform beam alignment with a second terminal. The processor may control the transceiver to receive downlink control information (DCI) associated with the second terminal from the base station. Herein, the DCI may be decoded based on at least one of a common radio network temporary identifier (RNTI), a sidelink-RNTI (SL-RNTI) of the second terminal, and a sidelink connection specific ID. The processor may control the transceiver to receive a physical sidelink control channel (PSCCH) and a physical sidelink shared channel (PSSCH) from the second terminal based on the DCI.

As an example of the present disclosure, a second terminal may include a transceiver and a processor coupled with the transceiver. The processor may perform a beam alignment with a first terminal. The processor may control the transceiver to transmit a sidelink scheduling request (SL-SR) and a sidelink buffer status report (SL-BSR) to a base station. The processor may control to receive downlink control information (DCI) associated with the second terminal from the base station. Herein, the DCI may be decoded based on at least one of a common radio network temporary identifier (RNTI), a sidelink-RNTI (SL-RNTI) of the second terminal, and a sidelink connection specific ID. The processor may control the transceiver to transmit a physical sidelink control channel (PSCCH) and a physical sidelink shared channel (PSSCH) to the first terminal based on the DCI.

As an example of the present disclosure, a device may include at least one processor and at least one memory functionally coupled with the at least one processor. The at least one processor may control the device to perform beam alignment with a sidelink transmission terminal. In addition, the processor may control the device to receive downlink control information (DCI) associated with the sidelink transmission terminal from a base station. Herein, the DCI may be decoded based on at least one of a common radio network temporary identifier (RNTI), a sidelink-RNTI (SL-RNTI) of the second terminal, and a sidelink connection specific ID. The at least one processor may control the device to receive a physical sidelink control channel (PSCCH) and a physical sidelink shared channel (PSSCH) from the sidelink transmission terminal based on the DCI.

As an example of the present disclosure, a non-transitory computer-readable medium may store at least one instruction. The computer-readable medium may include the at least one instruction that is executable by a processor. The at least one instruction may instruct the computer-readable medium to perform beam alignment with a sidelink transmission terminal. It may instruct the computer-readable medium to receive downlink control information (DCI) associated with the sidelink transmission terminal from a base station. Herein, the DCI may be decoded based on at least one of a common radio network temporary identifier (RNTI), a sidelink-RNTI (SL-RNTI) of the second terminal, and a sidelink connection specific ID. The at least one instruction may instruct the computer-readable medium to receive a physical sidelink control channel (PSCCH) and a physical sidelink shared channel (PSSCH) from the sidelink transmission terminal based on the DCI.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, a sidelink reception terminal may form a beam in a data transmission direction at an exact time.

According to the present disclosure, a sidelink reception terminal may not perform unnecessary PSCCH blind decoding.

According to the present disclosure, a resource allocation mode for existing sidelink data transmission may be applied to the present disclosure.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 11 is a view showing an example of assistance information applicable to the present disclosure.

DETAILED DESCRIPTION

Figure 1:
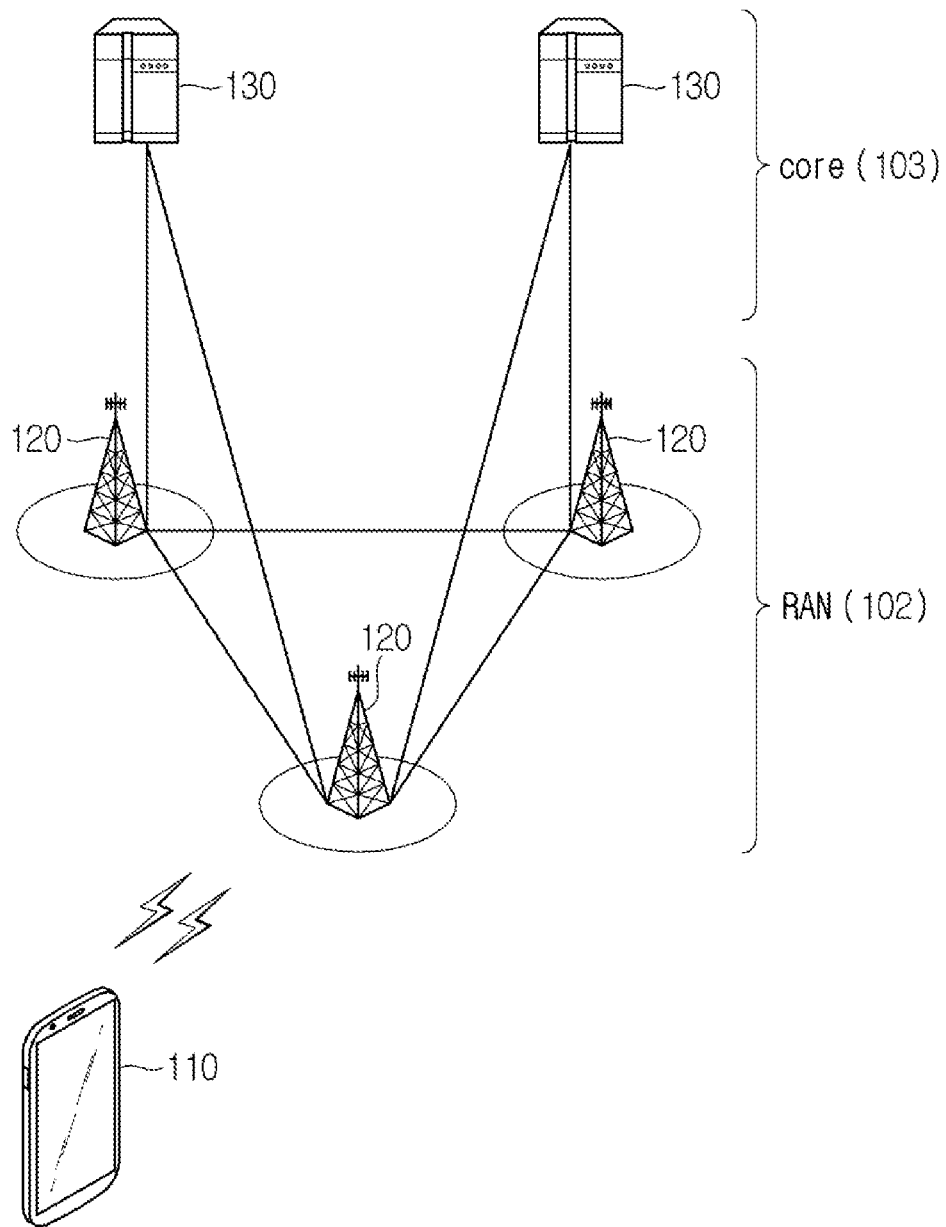
FIG. 1 illustrates a structure of a wireless communication system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of may be replaced with' 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

(1) 3GPP LTE
- 3GPP TS 36.211: Physical channels and modulation
- 3GPP TS 36.212: Multiplexing and channel coding
- 3GPP TS 36.213: Physical layer procedures
- 3GPP TS 36.214: Physical layer; Measurements
- 3GPP TS 36.300: Overall description
- 3GPP TS 36.304: User Equipment (UE) procedures in idle mode
- 3GPP TS 36.314: Layer 2—Measurements
- 3GPP TS 36.321: Medium Access Control (MAC) protocol
- 3GPP TS 36.322: Radio Link Control (RLC) protocol
- 3GPP TS 36.323: Packet Data Convergence Protocol (PDCP)
- 3GPP TS 36.331: Radio Resource Control (RRC) protocol (2) 3GPP NR (e.g. 5G)
- 3GPP TS 38.211: Physical channels and modulation
- 3GPP TS 38.212: Multiplexing and channel coding
- 3GPP TS 38.213: Physical layer procedures for control
- 3GPP TS 38.214: Physical layer procedures for data
- 3GPP TS 38.215: Physical layer measurements
- 3GPP TS 38.300: Overall description
- 3GPP TS 38.304: User Equipment (UE) procedures in idle mode and in RRC inactive state
- 3GPP TS 38.321: Medium Access Control (MAC) protocol
- 3GPP TS 38.322: Radio Link Control (RLC) protocol
- 3GPP TS 38.323: Packet Data Convergence Protocol (PDCP)
- 3GPP TS 38.331: Radio Resource Control (RRC) protocol
- 3GPP TS 37.324: Service Data Adaptation Protocol (SDAP)
- 3GPP TS 37.340: Multi-connectivity; Overall description Communication System Applicable to the Present Disclosure FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
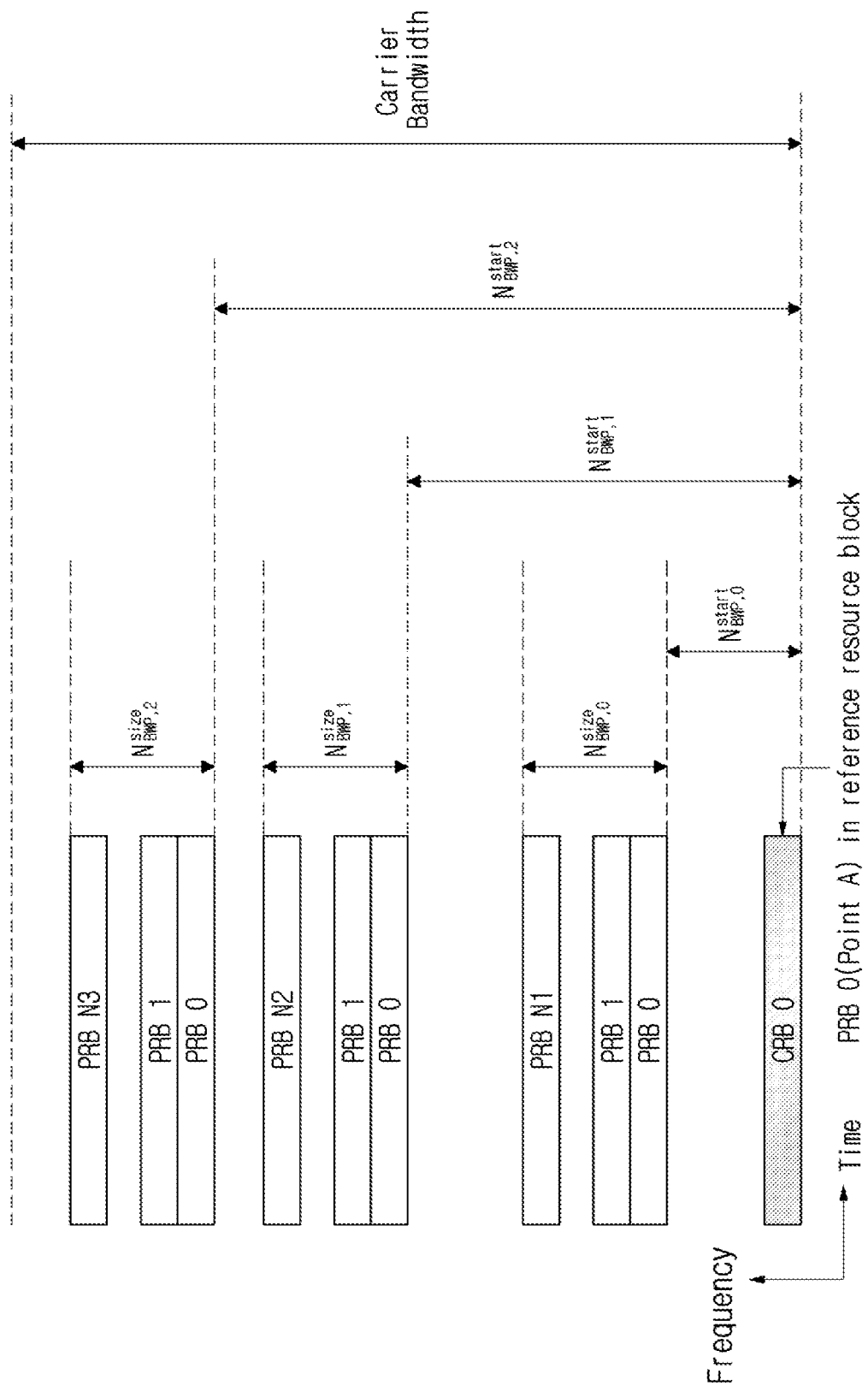
FIG. 2 illustrates an example of BWP according to an embodiment of the present disclosure.

FIG. 2 illustrates an example of a BWP applicable to the present disclosure. The embodiment of FIG. 2 may be combined with various embodiments of the present disclosure. It is assumed in the embodiment of FIG. 2 that the number of BWPs is 3.

Referring to FIG. 2, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset (NstartBWP) from the point A, and a bandwidth (NsizeBWP). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 3A:
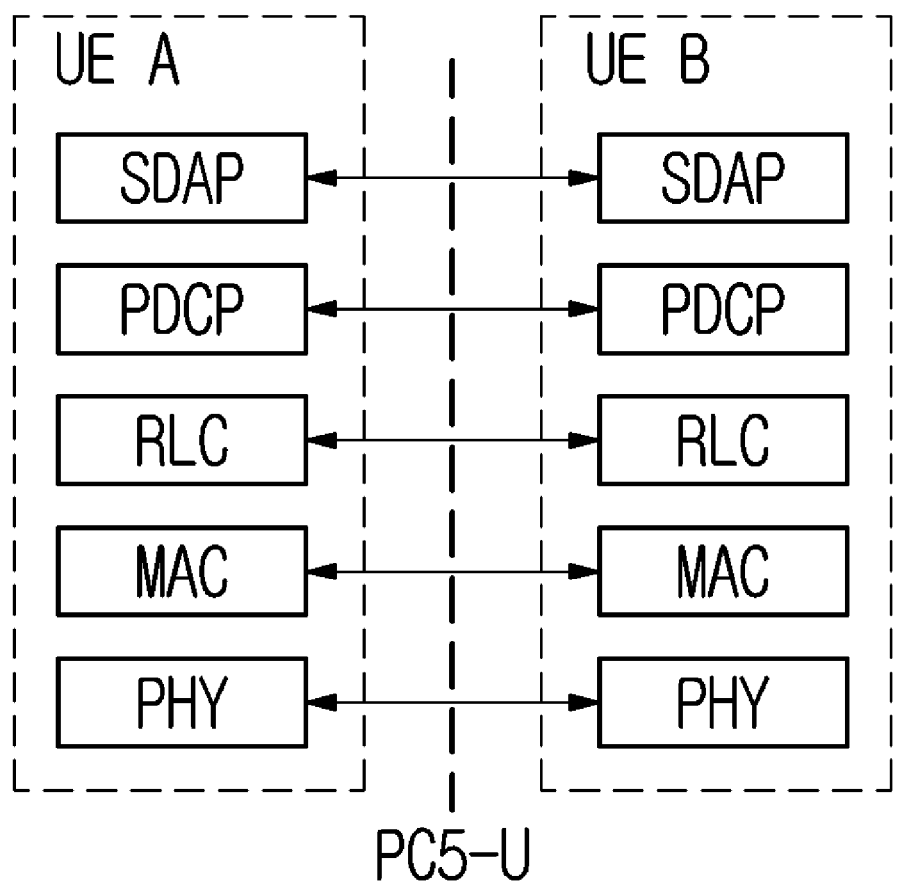
FIG. 3A and FIG. 3B illustrate a radio protocol architecture for SL communication according to an embodiment of the present disclosure.
Figure 3B:
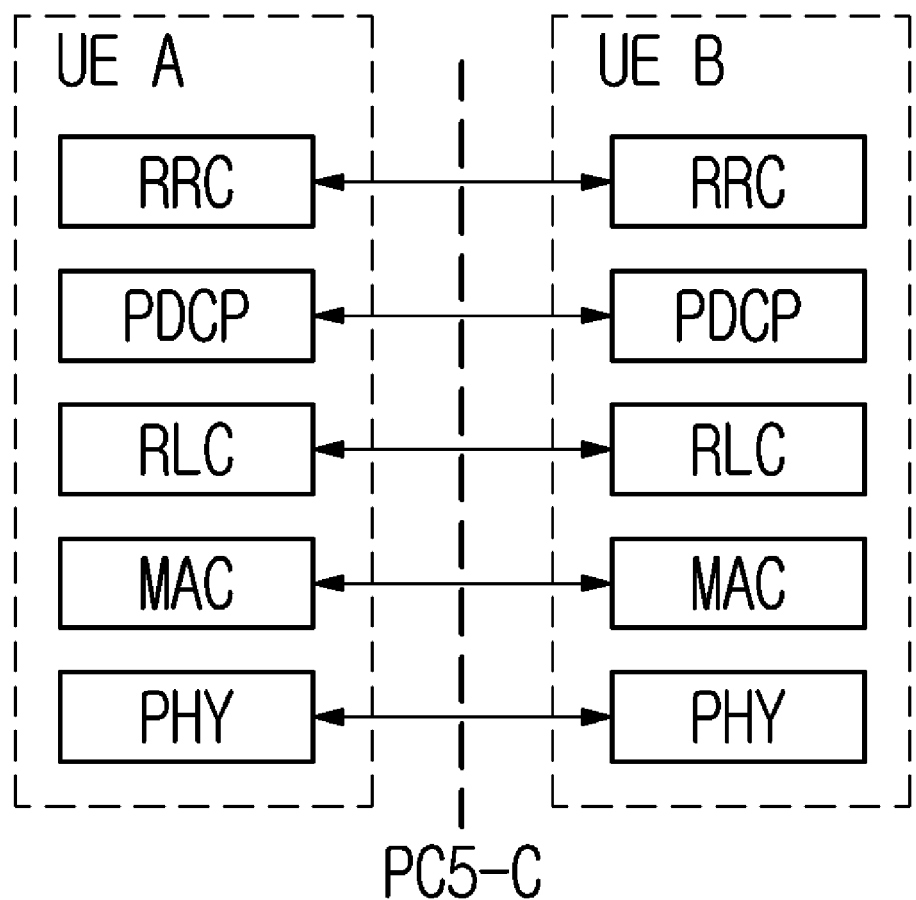

FIGS. 3A and 3B illustrate a radio protocol architecture for a SL communication applicable to the present disclosure. The embodiment of FIGS. 3A and 3B may be combined with various embodiments of the present disclosure. More specifically, FIG. 3A exemplifies a user plane protocol stack, and FIG. 3B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, based on Table 1, the UE may generate an S-SS/PSBCH block (i.e., S-SSB), and the UE may transmit the S-SS/PSBCH block (i.e., S-SSB) by mapping it on a physical resource.

TABLE 1

Time-frequency structure of an S-SS/PSBCH block
In the time domain, an S-SS/PSBCH block consists of $N_{symb}^{S-SSB}$ OFDM symbols, numbered in increasing order from 0 to $N_{symb}^{S-SSB} - 1$ within the S-SS/PSBCH block, where S-PSS, S-SSS, and PSBCH with associated DM-RS are mapped to symbols as given by Table 8.4.3.1-1.
The number of OFDM symbols in an S-SS/PSBCH block $N_{symb}^{S-SSB} = 13$ for normal cyclic prefix and $N_{symb}^{S-SSB} = 11$ for extended cyclic prefix.
The first OFDM symbol in an S-SS/PSBCH block is the first OFDM symbol in the slot.
In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block.
For an S-SS/PSBCH block, the UE shall use
antenna port 4000 for transmission of S-PSS, S-SSS, PSBCH and DM-RS for PSBCH;
the same cyclic prefix length and subcarrier spacing for the S-PSS, S-SSS, PSBCH and DM-RS for PSBCH.
Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S-SSB} - 1$ | 0, 1, . . . , 131 |
| DM-RS for PSBCH | 0, 5, 6, . . . , $N_{symb}^{S-SSB} - 1$ | 0, 4, 8, . . . , 128 |

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 4:
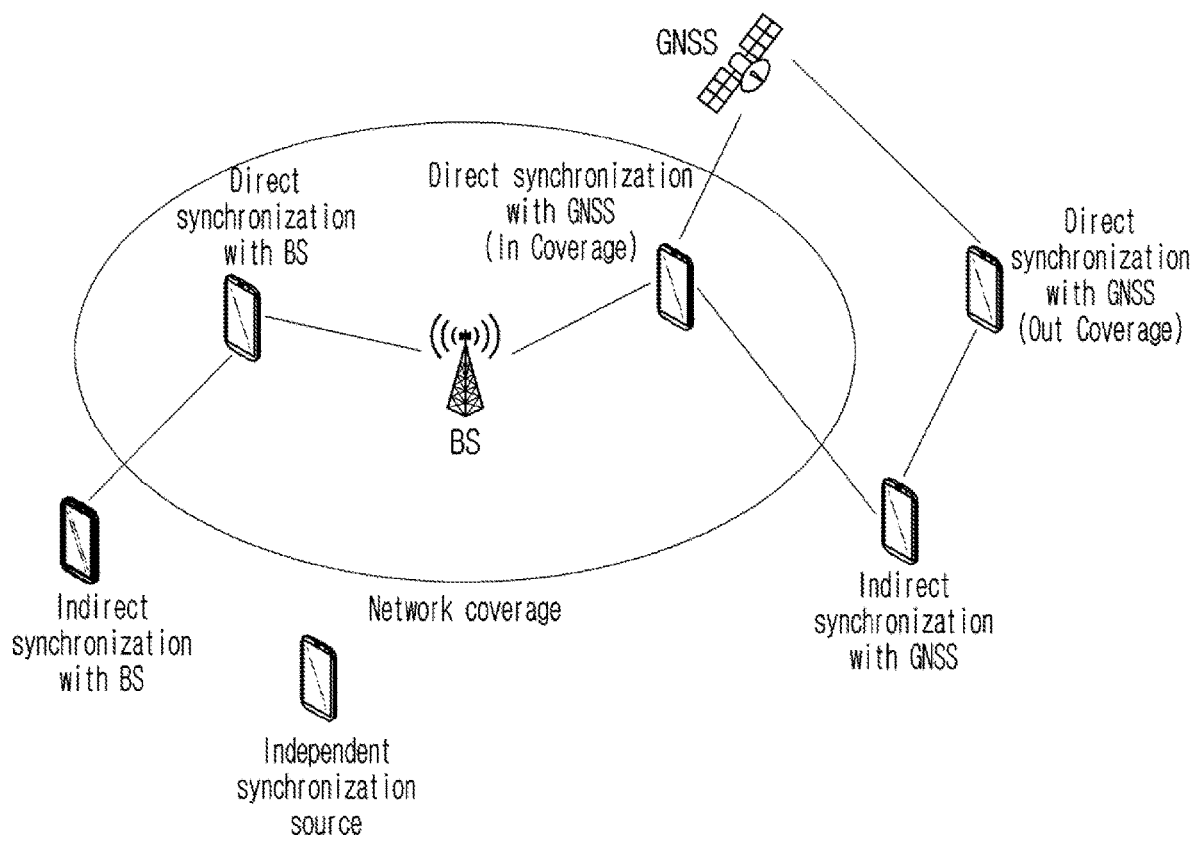
FIG. 4 illustrates a synchronization source or a synchronization reference of V2X according to an embodiment of the present disclosure.

FIG. 4 illustrates a synchronization source or synchronization reference of V2X applicable to the present disclosure. The embodiment of FIG. 4 may be combined with various embodiments of the present disclosure.

Referring to FIG. 4, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |

TABLE 2-continued

| Priority Level | GNSS-based synchronization | eNB/gNB-based synchronization |
|---|---|---|
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the UE may (re)select a synchronization reference, and the UE may obtain synchronization from the synchronization reference. In addition, the UE may perform SL communication (e.g., PSCCH/PSSCH transmission/reception, physical sidelink feedback channel (PSFCH) transmission/reception, S-SSB transmission/reception, reference signal transmission/reception, etc.) based on the obtained synchronization.

Figure 5A:
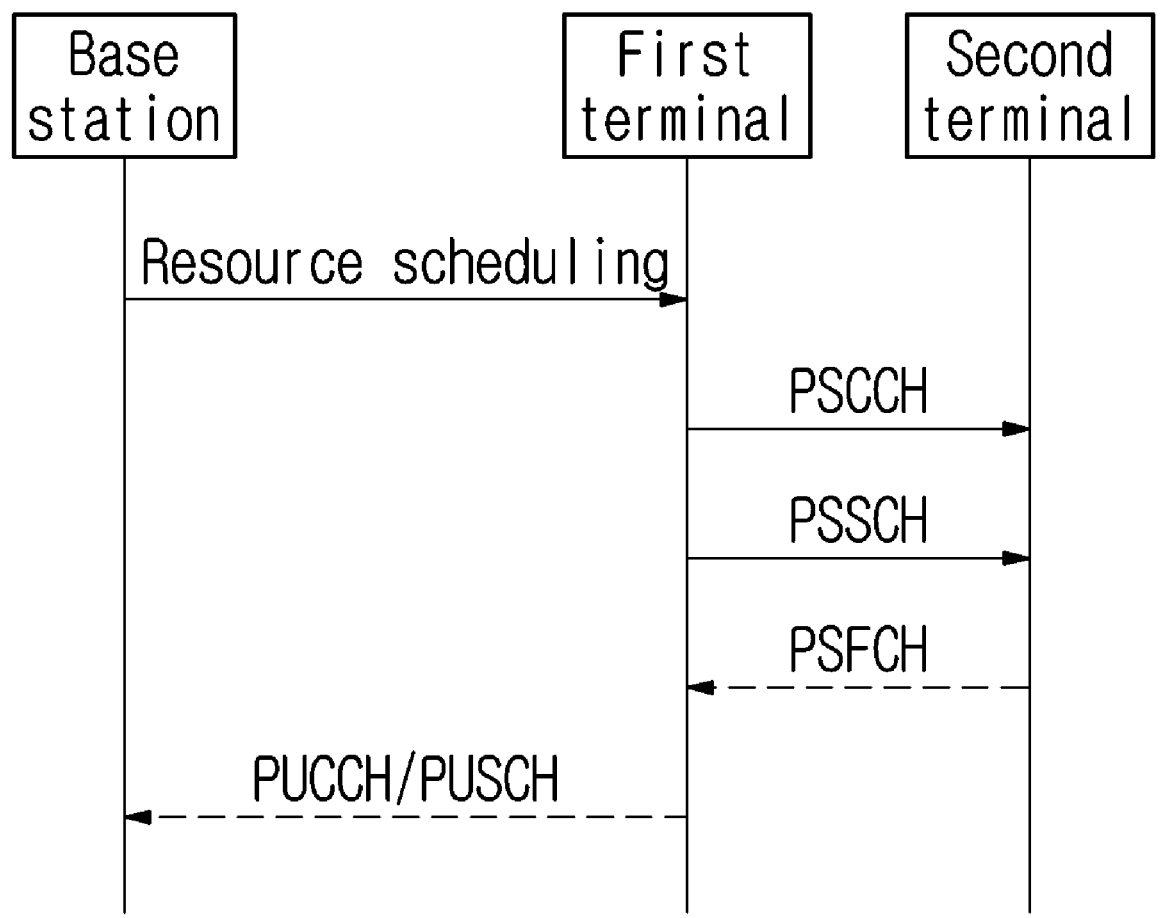
FIG. 5A and FIG. 5B illustrate a procedure in which a terminal performs V2X or SL communication according to a transmission mode, in accordance with an embodiment of the present disclosure.
Figure 5B:
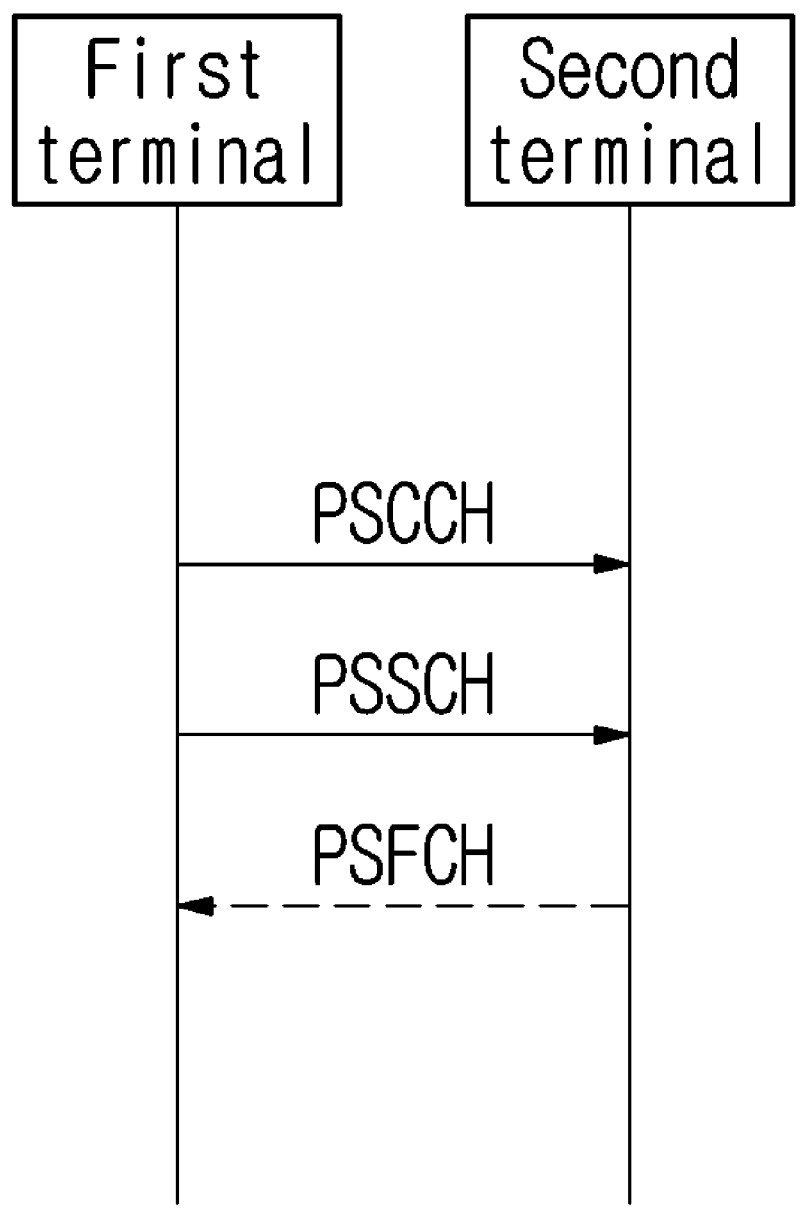

FIGS. 5A and 5B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 5A exemplifies a UE operation related to an LTE transmission mode 1 or an LTE transmission mode 3. Alternatively, for example, FIG. 5B exemplifies a UE operation related to an NR resource allocation mode 1. For example, the LTE transmission mode 1 may be applied to general SL communication, and the LTE transmission mode 3 may be applied to V2X communication.

For example, FIG. 5B exemplifies a UE operation related to an LTE transmission mode 2 or an LTE transmission mode 4. Alternatively, for example, FIG. 5A exemplifies a UE operation related to an NR resource allocation mode 2.

Referring to FIG. 5A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

Subsequently, the first UE may transmit a PSCCH (e.g., sidelink control information (SCI) or 1st-stage SCI) to a second UE based on the resource scheduling. After then, the first UE may transmit a PSSCH (e.g., 2nd-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling.

TABLE 4

3GPP TS 38.212

Format 3.0
DCI format 3_0 is used for scheduling of NR PSCCH and NR PSSCH in one cell.
The following information is transmitted by means of the DCI format 3_0 with CRC scrambled by SL-RNTI or SL-CS-RNTI:
Resource pool index -[$\log_2$ I] bits, where l is the number of resource pools for transmission configured by the higher layer parameter sl-TxPoolScheduling.
Time gap - 3 bits determined by higher layer parameter sl-DCI-ToSL-Trans, as defined in clause 8.1.2.1 of [6, TS 38.214]
HARQ process number - 4 bits as defined in clause 16.4 of [5, TS 38.213]

TABLE 4-continued

3GPP TS 38.212

New data indicator - 1 bit as defined in clause 16.4 of [5, TS 38.213]
Lowest index of the subchannel allocation to the initial transmission -
[log₂(N$_{subChannel}^{SL}$)] bits as defined in clause 8.1.2.2 of [6, TS 38.214]
SCI format 1-A fields according to clause 8.3.1.1:
Frequency resource assignment.
Time resource assignment.
PSFCH-to-HARQ feedback timing indicator - [log₂ N$_{fb\_timing}$] bits,
where N$_{fb\_timing}$ is the number of entries in the higher layer parameter
sf-PSFCH-ToPUCCH, as defined in clause 16.5 of [5, TS 38.213]
PUCCH resource indicator - 3 bits as defined in clause 16.5 of [5, TS
38.213].
Configuration index - 0 bit if the UE is not configured to monitor DCI
format 3_0 with CRC scrambled by SL-CS-RNTI; otherwise 3 bits as
defined in clause 8.1.2 of [6, TS 38.214]. If the UE is configured to
monitor DCI format 3_0 with CRC scrambled by SL-CS-RNTI, this
field is reserved for DCI format 3_0 with CRC scrambled by SL-RNTI.
Counter sidelink assignment index - 2 bits
2 bits as defined in clause 16.5.2 of [5, TS 38.213] if the UE is
configured with pdsch-HAPQ-ACK-Codebook = dynamic
2 bits as defined in clause 16.5.1 of [5, TS 38.213] if the UE is
configured with pdsch-HARQ-ACK-Codebook = semi-static
Padding bits, if required
Format 3_1
DCI format 3_1 is used for scheduling of LTE PSCCH and LTE PSSCH
in one cell.
The following information is transmitted by means of the DCI formal
3_1 with CRC scrambled by SL-L-CS-RNTI:
Timing offset - 3 bits determined by higher layer parameter
sl-TimeOffsetEUTRA, as defined in clause 16.6 of [5, TS 38.213]
Carrier indicator - 3 bits as defined in 5.3.3.1.9A of [11, TS 36.212].
Lowest index of the subchannel allocation to the initial transmission -
⌈log₂(N$_{subChannel}^{SL}$)⌉ bits as defined in 5.3.3.1.9A of [11, TS 36.212].
Frequency resource location of initial transmission and retransmission,
as defined in 5.3.3.1.9A of [11, TS 36.212]
Time gap between initial transmission and retransmission, as defined in
5.3.3.1.9A of [11, TS 36.212]
SL index - 2 bits as defined in 5.3.3.1.9A of [11, TS 36.212]
SL SPS configuration index - 3 bits as defined in clause 5.3.3.1.9A of
[11, TS 36.212].
Activation/release indication - 1 bit as defined in clause 5.3.3.1.9A of
[11, TS 36.212].

Referring to FIG. 5B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannel(s). For example, subsequently, a first UE which has selected resource(s) from a resource pool by itself may transmit a PSCCH (e.g., sidelink control information (SCI) or 1st-stage SCI) to a second UE by using the resource(s). After then, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE.

Referring to FIGS. 5A and 5B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B. Table 5 shows an example of a 1st-stage SCI format.

TABLE 5

3GPP TS 38.212

■ SCI format 1-A
SCI format 1-A is used for the scheduling of PSSCH and 2$^{nd}$-stage-SCI on PSSCH
The following information is transmitted by means of the SCI format 1-A:
    Priority-3 bits as specified in clause 5.4.3.3 of [12, TS 23.287] and clause 5.22.1.3.1
    of [8, TS 38.321].

$$\text{Frequency resource assignment-}\left\lceil \log_2\left(\frac{N_{subChannel}^{SL}(N_{subChannel}^{SL}+1)}{2}\right)\right\rceil \text{ bits when the value of}$$

the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil \text{ bits when the value of the higher layer}$$

parameter sl-MaxNumPerReserver is configured to 3. as defined in clause 8.1.2.2 of
[6, TS 38.214].
Time resource assignment-5 bits when the value of the higher layer parameter
sl-MaxNumPerReserve is configured to 2; otherwise 9 bits when the value of the higher
layer parameter sl-MaxNumPerReserve is configured to 3. as defined in clause 8.1.2.1 of
[6, TS 38.214].
Resource reservation period-[log₂ N$_{rsv\_period}$] bits as defined in clause 8.1.4 of [6, TS 38.214],
where N$_{rsv\_period}$ is the number of entries in the higher layer parameter
sl-ResourceReservePeriodList, if higher layer parameter sl-MultiReserveResource is
configured; 0 bit otherwise.

TABLE 5-continued

DMRS pattern-[$\log_2 N_{pattern}$] bits as defined in clause 8.4.1.1.2 of [4, TS 38.211], where $N_{pattern}$ is the number of DMRS patterns configured by higher layer parameter sl-PSSCH-DMRS-TimePatternList.
$2^{nd}$-stage SCI format-2 bits as defined in Table 8.3.1.1-1.
Beta_offset indicator-2 bits as provided by higher layer parameter sl-BetaOffsets2ndSCI and Table 8.3.1.1-2.
Number of DMRS port-1 bit as defined in Table 8.3.1.1-3
Modulation and coding scheme-5 bits as defined in clause 8.1.3 of [6, TS 38.214].
Additional MCS table indicator-as define in clause 8.1.3.1 of [6, TS 38.214]: 1 bit if one MCS table is confgured by higher layer parameter sl-Additional-MCS-Table: 2 bits if two MCS tables are configured by higher layer parameter sl-Additional-MCS-Table; 0 bit otherwise.
PSFCH overhead indication-1 bit as defined clause 8.1.3.2 of [6, TS 38.214] if higher layer parameter sl-PSFCH-Period = 2 or 4; 0 bit otherwise.
Reserved-a number of bits as determined by higher layer parameter sl-NumReservedBits, with value set to zero.

Table 8.3.1.1-1: $2^{nd}$- stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

Table 8.3.1.1-2: Mapping of Beta-offset indicator values to indexes in Table 9.3-2 of [5, TS38.213]

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 6 shows an example of a 2nd-stage SCI format.

TABLE 6

3GPP TS 38.212

SCI format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
HARQ process number-4 bits as defined in clause 16.1 of [5, TS 38.213].
New data indicator-1 bit as defined in clause 16.4 of [5, TS 38.213].
Redundancy version-2 bits as defined in clause 16.4 of [5, TS 38.213].
Source ID-8 bits as defined in clause 8.1 of [6, TS 38.214].
Destination ID-16 bits as defined in clause 8.1 of [6, TS 38.214].
HARQ feedback enabled/disabled indicator-1 bit as defined in clause 16.3 of 15, TS 38.213].
Cast type indicator-2 bits as defined in Table 8.4.1.1-1.
CSI request-1 bit is defined in clause 8.2.1 of [6, TS 38.214].

Table 8.4.1.1-1: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

TABLE 6-continued

| 3GPP TS 38.212 |
| --- |
| SCI format 2-B |
| SCI format 2-B is used for the decoding of PSSCH, with HARQ operation when HARQ-ACK information includes only NACK, or when there is no feedback of HARQ-ACK information. The following information is transmitted by means of the SCI format 2-B:<br>HARQ process number-4 bits as defined in clause 16.4 of [5, TS 38.213].<br>New data indicator-1 bit as defined in clause 16.4 of [5, TS 38.213].<br>Redundancy version-2 bits as defined in clause 16.4 of [6, TS 38.214].<br>Source ID-8 bits as defined in clause 8.1 of [6, TS 38.214].<br>Destination ID-16 bits as defined in clause 8.1 of [6, TS 38.214].<br>HARQ feedback enabler]/disabled indicator-1 bit as defined in clause 16.3 of [5, TS 38.213].<br>Zone ID-12 bits as defined in clause 5.8.11 of [9, TS 38.331].<br>Communication range requirement-4 bits determined by higher layer parameter sl-ZoneConfigMCR-Index. |

Referring to FIGS. 5A and 5B, the first UE may receive the PSFCH based on Table 7. For example, the first UE and the second UE may determine a PSFCH resource based on Table 7, and the second UE may transmit HARQ feedback to the first UE using the PSFCH resource.

TABLE 7

| 3GPP TS 38.213 |
| --- |

■ UE procedure for reporting HARQ-ACK on sidelink

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled.

A UE expects that a slot $t'^{SL}_k$ ($0 \leq k < T'_{max}$) has a PSFCH transmission occasion resource if k mod $N_{PSSCH}^{PSFCH} = 0$, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16.

A UE may be indicated by higher layers to not transmit a PSFCH in response to a PSSCH reception [11, TS 38.321].

If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of $M_{PRB, set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSSCH slot that is less than or equal to $N_{PSSCH}^{PSFCH}$, the UE allocates the [(i + j · $N_{PSSCH}^{PSFCH}$) · $M_{subch, slot}^{PSFCH}$, (i + 1 + j · $N_{PSSCH}^{PSFCH}$) · $M_{subch, slot}^{PSFCH}$ − 1] PRBs from the $M_{PRB, set}^{PSFCH}$ PRBs to slot i among the PSSCH slots associated with the PSFCH slot and sub-channel j, where $M_{subch, slot}^{PSFCH} = M_{PRB, set}^{PSFCH}/(N_{subch} \cdot N_{PSSCH}^{PSFCH})$, $0 \leq i < N_{PSSCH}^{PSFCH}$, $0 \leq j < N_{subch}$, and the allocation starts in an ascending order of i and continues in an ascending order of j. The UE expects that $M_{PRB, set}^{PSFCH}$ is a multiple of $N_{subch} \cdot N_{PSSCH}^{PSFCH}$.

A UE determines a number of PSFCH resources available for multiplexing HARQ-ACK information in a PSFCH transmission as $R_{PRB, CS}^{PSFCH} = N_{type}^{PSFCH} \cdot M_{subch, slot}^{PSFCH} \cdot N_{CS}^{PSFCH}$ where $N_{CS}^{PSFCH}$ is a number of cyclic shift pairs for the resource pool and, based on an indication by higher layers.

- $N_{type}^{PSFCH} = 1$ and the $M_{subch, slot}^{PSFCH}$ PRBs are associated with the starting sub-channel of the corresponding PSSCH
- $N_{type}^{PSFCH} = N_{subch}^{PSSCH}$ and the $N_{subch}^{PSSCH} \cdot M_{subch, slot}^{PSFCH}$ PRBs are associated with one or more sub-channels from the $N_{subch}^{PSSCH}$ sub-channels of the corresponding PSSCH The PSFCH resources are first indexed according to an ascending order of the PRB index, from the $N_{type}^{PSFCH} \cdot M_{subch, slot}^{PSFCH}$ PRBs, and then according to an ascending order of the cyclic shift pair index from the $N_{CS}^{PSFCH}$ cyclic shift pairs.

TABLE 7-continued

3GPP TS 38.213

A UE determines an index of a PSFCH resource for a PSFCH transmission in response to a
PSSCH reception as $(P_{ID} + M_{ID}) \bmod R_{PRB, CS}^{PSFCH}$ where $P_{ID}$ is a physical layer source ID provided
by SCI format 2-A or 2-B [5, TS 38.212] scheduling the PSSCH reception, and $M_{ID}$ is the
identity of the UE receiving the PSSCH as indicated by higher layers if the UE detects a SCI
format 2-A with Cast type indicator field value of "01"; otherwise, $M_{ID}$ is zero.
A UE determines a $m_0$ value, for computing a value of cyclic shift α [4, TS 38.211], from a
cyclic shift pair index corresponding to a PSFCH resource index and from $N_{CS}^{PSFCH}$ using
Table 16.3-1.

Table 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α [4, TS 38.211], as in
Table 16.3-2 if the UE detects a SCI format 2-A with Cast type indicator field value of "01"
or "10", or as in Table 16.3-3 if the UE detects a SCI format 2-B or a SCI format 2-A with
Cast type indicator field value of "11". The UE applies one cyclic shift from a cyclic shift pair
to a sequence used for the PSFCH transmission [4, TS 38.211].

Table 16.3-2: Mapping of HARQ-ACK information bit values to a cyclic shift, from a cyclic shift
pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift
pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to FIG. 5A, the first UE may transmit SL HARQ feedback to the base station through the PUCCH and/or the PUSCH based on Table 8.

TABLE 8

3GPP TS 38.213

16.5 UE procedure for reporting HARQ-ACK on uplink
A UE can be provided PUCCH resources or PUSCH resources [12, TS 38.331] to report
HARQ-ACK Information that the UE generates based on HARQ-ACK information that the UE
obtains from PSFCH receptions, or from absence of PSFCH receptions. The UE reports
HARQ-ACK information on the primary cell of the PUCCH group, as described in Clause 9,
of the cell where the UE monitors PDCCH for detection of DCI format 3_0.
For SL configured grant Type 1 or Type 2 PSSCH transmissions by a UE within a time period
provided by sl-PeriodCG, the UE generates one HARQ-ACK information bit in response to
the PSFCH receptions to multiplex in a PUCCH transmission occasion that is after a last time
resource, in a set of time resources.
For PSSCH transmissions scheduled by a DCI format 3_0, a UE generates HARQ-ACK
information in response to PSFCH receptions to multiplex in a PUCCH transmission occasion
that is after a last time resource in a set of time resources provided by the DCI format 3_0.
For each PSFCH reception occasion, from a number of PSFCH reception occasions, the UE
generates HARQ-ACK information to report in a PUCCH or PUSCH transmission. The UE
can be indicated by a SCI format to perform one of the following and the UE constructs a
HARQ-ACK codeword with HARQ-ACK information. when applicable
if the UE receives a PSFCH associated with a SCI format 2-A with Cast type indicator
field value of "1.0"
generate HARQ-ACK information with same value as a value of HARQ-ACK
information the UE determines from a PSFCH reception in the PSFCH reception
occasion and, if the UE determines that a PSFCH is not received at the PSFCH.
reception occasion, generate NACK
if the UE receives a PSFCH associated with a SCI format 2-A with Cast type indicator
field value of "01"

TABLE 8-continued

3GPP TS 38.213 generate ACK if the UE determines ACK from at least one PSFCH reception
occasion, from the number of PSFCH reception occasions, in PSFCH resources
corresponding to every identity $M_{ID}$ of the UEs that the UE expects to receive the
PSSCH. as described in Clause 16.3; otherwise, generate NACK
if the UE receives a PSFCH associated with a SCI format 2-B or a SCI format 2-A with
Cast type indicator field value of "11"
generate ACK when the UE determines absence of PSFCH reception for each
PSFCH reception occasion from the number of PSFCH reception occasions:
otherwise, generate NACK
After a UE transmits PSSCHs and receives PSFCHs in corresponding PSFCH resource
occasions, the priority value of HARQ-ACK information is same as the priority value of the
PSSCH transmissions that is associated with the PSFCH reception occasions providing the
HARQ-ACK information.
The UE generates a NACK when, due to prioritization, as described in Clause 16.2.4, the UE
does not receive PSFCH in any PSFCH reception occasion associated with a PSSCH
transmission in a resource provided by a DCI format 3_0 with CRC scrambled by a SL-RNTI
or, for a configured grant, in a resource provided in a single period and for which the UE is
provided a PUCCH resource to report HARQ-ACK information. The priority value of the
NACK is same as the priority value of the PSSCH transmission.
The UE generates a NACK when, due to prioritization as described in Clause 16.2.4, the UE
does not transmit a PSSCH in any of the resources provided by a DCI format 3_0 with CRC
scrambled by SL-RNTI or, for a configured grant, in any of the resources provided in a single
period and for which the UE is provided a PUCCH resource to report HARQ-ACK information.
The priority value of the NACK is same as the priority value of the PSSCH that was not
transmitted due to prioritization.
The UE generates an ACK if the UE does not transmit a PSCCH with a SCI format 1-A
scheduling a PSSCH in any of the resources provided by a configured grant in a single period
and for which the UE is provided a PUCCH resource to report HARQ-ACK information. The
priority value of the ACK is same as the largest priority value among the possible priority
values for the configured grant.
A UE does not expect to be provided PUCCH resources or PUSCH resources to report
HARQ-ACK information that start earlier than $(N + 1) \cdot (2048 + 144) \cdot \kappa \cdot 2^\mu \cdot T_c$ after the end
of a last symbol of a last PSFCH reception occasion, from a number of PSFCH reception
occasions that the UE generates HARQ-ACK information to report in a PUCCH or PUSCH
transmission, where
$\kappa$ and $T_c$ are defined in [4, TS 38.211]
$\mu = \min(\mu_{SL}, \mu_{UL})$, where $\mu_{SL}$ is the SCS configuration of the SL BWP and $\mu_{UL}$ is the SCS
configuration of the active UL BWP on the primary cell
N is determined from $\mu$ according to Table 16.5-1

Table 16.5-1: Values of N

| $\mu$ | N |
| --- | --- |
| 0 | 14 |
| 1 | 18 |
| 2 | 28 |
| 3 | 32 |

With reference to slots for PUCCH transmissions and for a number of PSFCH reception
Occasions ending in slot n, the UE provides the generated HARQ-ACK information in a
PUCCH transmission within slot n + k, subject to the overlapping conditions in Clause 9.2.5,
where k is a number of slots indicated by a PSFCH-to-HARQ_feedback timing indicator
field, if present, in a DCI format indicating a slot for PUCCH transmission to report the HARQ-
ACK information, or k is provided by sl-PSFCH-ToPUCCH-CG-Type1-r16. k = 0
corresponds to a last slot for a PUCCH transmission that would overlap with the last PSFCH
reception occasion assuming that the start of the sidelink frame is same as the start of the
downlink frame [4, TS 38.211].
For a PSSCH transmission by a UE that is scheduled by a DCI format, or for a SL configured
grant Type 2 PSSCH transmission activated by a DCI format, the DCI format indicates to the
UE that a PUCCH resource is not provided when a value of the PUCCH resource indicator
field is zero and a value of PSFCH-to-HARQ feedback timing indicator field, if present, is
zero. For a SL configured grant Type 1 PSSCH transmission, a PUCCH resource can be
provided by sl-N1PUCCH-AN-r16 and sl-PSFCH-ToPUCCH-CG-Type1-r16. If a PUCCH
resource is not provided, the UE does not transmit a PUCCH with generated HARQ-ACK
information from PSFCH reception occasions.
For a PUCCH transmission with HARQ-ACK information, a UE determines a PUCCH resource
after determining a set of PUCCH resources for $O_{UCI}$ HARQ-ACK information bits, as
described in Clause 9.2.1. The PUCCH resource determination is based on a PUCCH resource
indicator field [5, TS 38.212] in a last DCI format 3_0, among the DCI formats 3_0 that have
a value of a PSFCH-to-HARQ_feedback timing indicator field indicating a same slot for the
PUCCH transmission, that the UE detects and for which the UE transmits corresponding
HARQ-ACK information in the PUCCH where, for PUCCH .resource determination, detected
DCI formats are indexed in an ascending order across PDCCH monitoring occasion indexes.
A UE does not expect to multiplex HARQ-ACK information for more than one SL configured
grants in a same PUCCH.

TABLE 8-continued

3GPP TS 38.213

A priority value of a PUCCH transmission with one or more sidelink HARQ-ACK information bits is the smallest priority value for the one or more HARQ-ACK information bits.
In the following, the CRC for DCI format 3_0 is scrambled with a SL-RNTI or a SL-CS-RNTI.

Figure 6A:
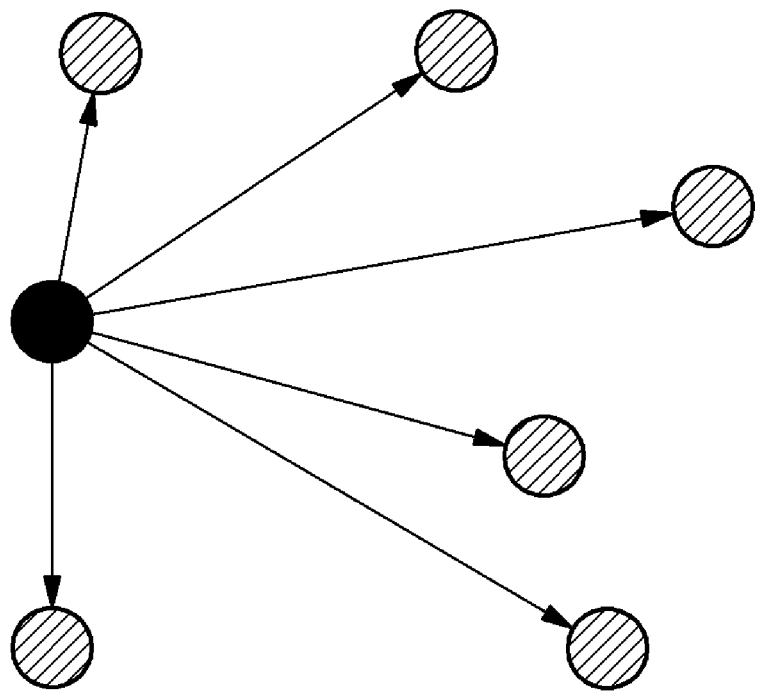
FIG. 6A to FIG. 6C illustrate 3 cast types according to an embodiment of the present disclosure.
Figure 6B:
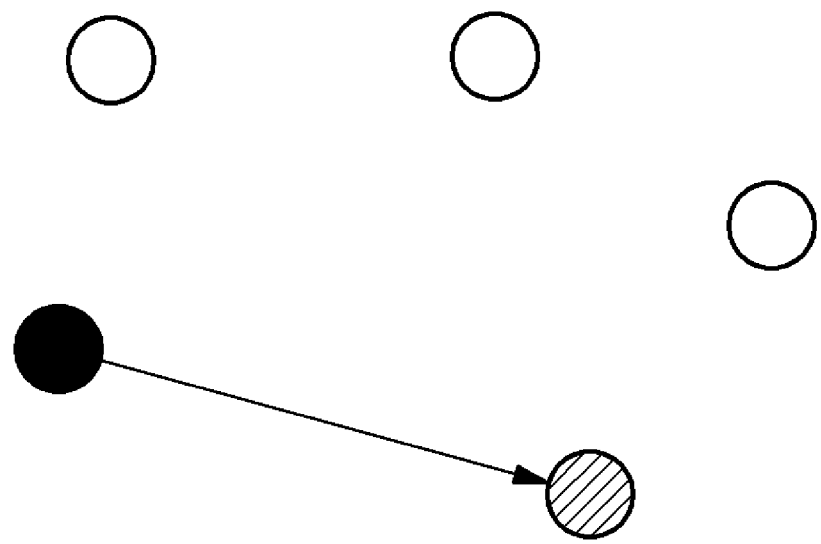
Figure 6C:
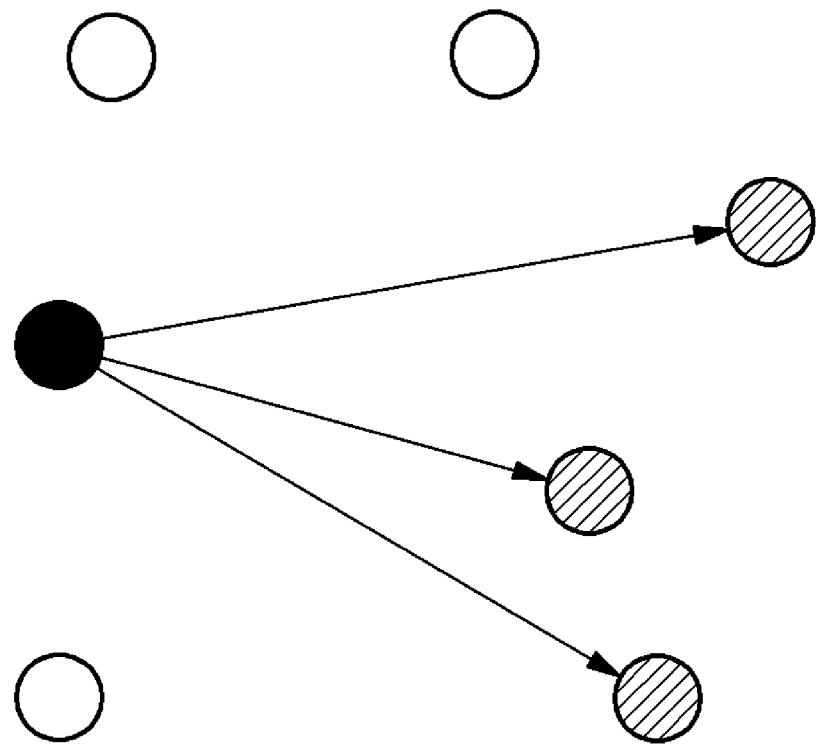

FIGS. 6A to 6C illustrate three cast types applicable to the present disclosure. The embodiment of FIGS. 6A to 6C may be combined with various embodiments of the present disclosure.

Specifically, FIG. 6A exemplifies broadcast-type SL communication, FIG. 6B exemplifies unicast type-SL communication, and FIG. 6C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 7:
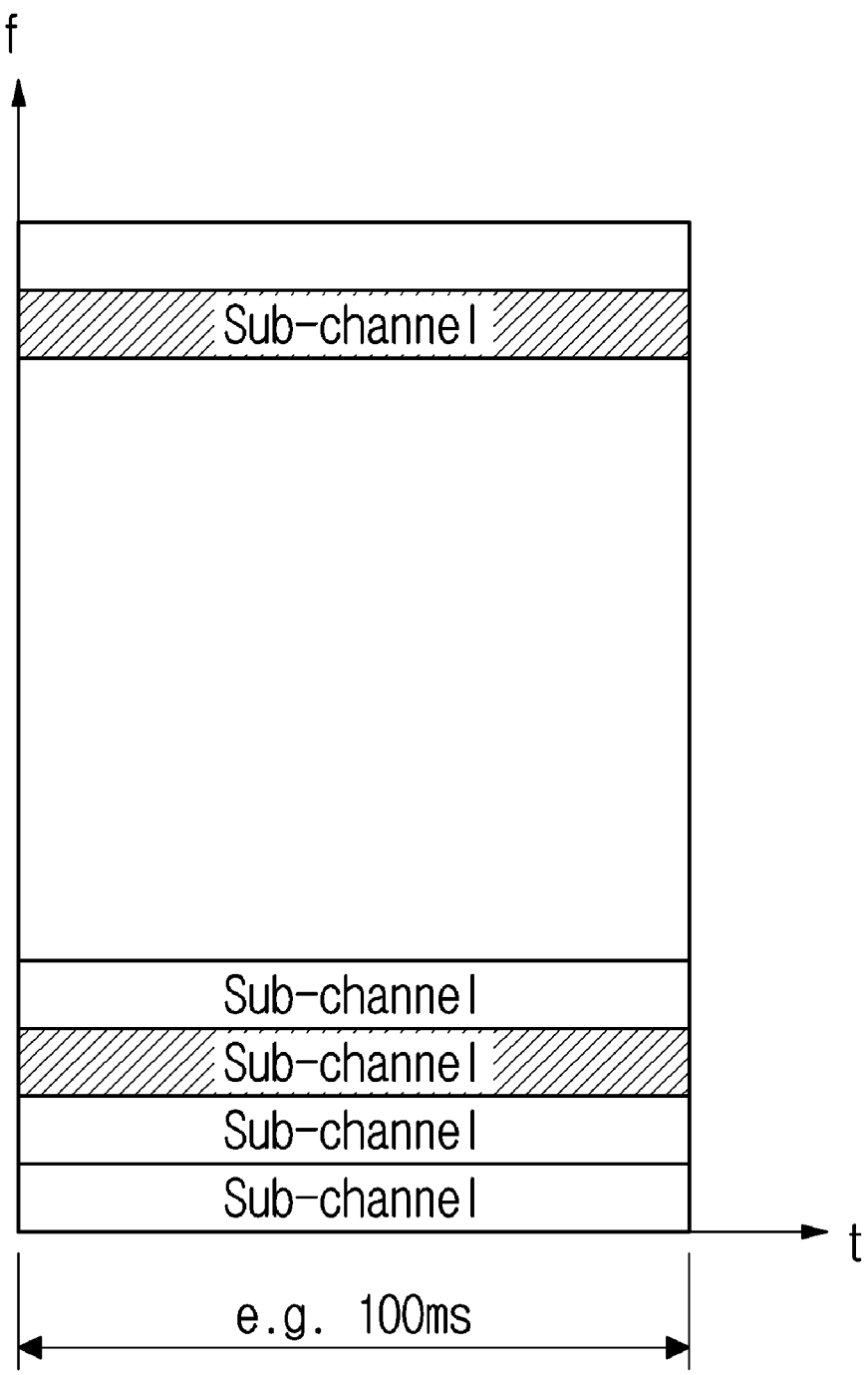
FIG. 7 illustrates a resource unit for CBR measurement according to an embodiment of the present disclosure.

FIG. 7 illustrates resource units for CBR measurement applicable to the present disclosure. The embodiment of FIG. 7 may be combined with various embodiments of the present disclosure.

Referring to FIG. 7, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 7, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

An example of SL CBR and SL RSSI is as follows. In the description below, the slot index may be based on a physical slot index.

A SL CBR measured in slot n is defined as the portion of sub-channels in the resource pool whose SL RSSI measured by the UE exceed a (pre-)configured threshold sensed over a CBR measurement window [n−a, n−1]. Herein, a is equal to 100 or 100·2μ slots, according to higher layer parameter sl-TimeWindowSizeCBR. The SL CBR is applicable for RRC_IDLE intra-frequency, RRC_IDLE inter-frequency, RRC_CONNECTED intra-frequency, or RRC_CONNECTED inter-frequency A SL RSSI is defined as the linear average of the total received power (in [W]) observed in the configured sub-channel in OFDM symbols of a slot configured for PSCCH and PSSCH, starting from the 2nd OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. The SL RSSI is applicable for RRC_IDLE intra-frequency, RRC_IDLE inter-frequency, RRC_CONNECTED intra-frequency or RRC_CONNECTED inter-frequency.

An example of an SL (Channel occupancy Ratio) is as follows. The SL CR evaluated at slot n is defined as the total number of sub-channels used for its transmissions in slots [n−a, n−1] and granted in slots [n, n+b] divided by the total number of configured sub-channels in the transmission pool over [n−a, n+b]. The SL CR is applicable for RRC_IDLE intra-frequency, RRC_IDLE inter-frequency, RRC_CONNECTED intra-frequency or RRC_CONNECTED inter-frequency. Herein, a may be a positive integer and b may be 0 or a positive integer. a and b may be determined by UE implementation with a+b+1=1000 or 1000·2μ slots, according to higher layer parameter sl-TimeWindowSizeCR, b<(a+b+1)/2, and n+b shall not exceed the last transmission opportunity of the grant for the current transmission. The SL CR is evaluated for each (re)transmission. In evaluating SL CR, the UE shall assume the transmission parameter used at slot n is reused according to the existing grant(s) in slot [n+1, n+b] without packet dropping. The slot index is based on physical slot index. The SL CR can be computed per priority level. A resource is considered granted if it is a member of a selected sidelink grant as defined in TS 38.321.

Positioning

Figure 8:
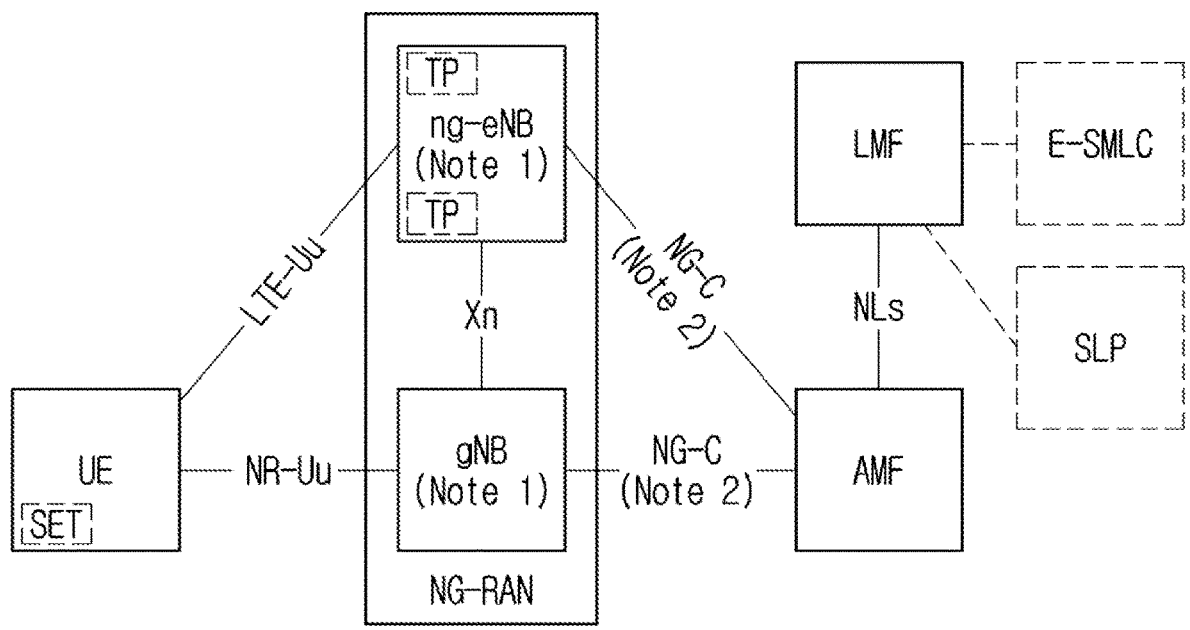
FIG. 8 illustrates an example of an architecture in a 5G system, in which positioning is possible for a UE connected with a next generation-radio access network (NR-RAN) or E-UTRAN, according to an embodiment of the present disclosure.

FIG. 8 illustrates an example of an architecture of a 5G system capable of positioning a UE connected to an NG-RAN or an E-UTRAN applicable to the present disclosure.

Referring to FIG. 8, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Concrete Embodiment of the Present Disclosure

Figure 9A:
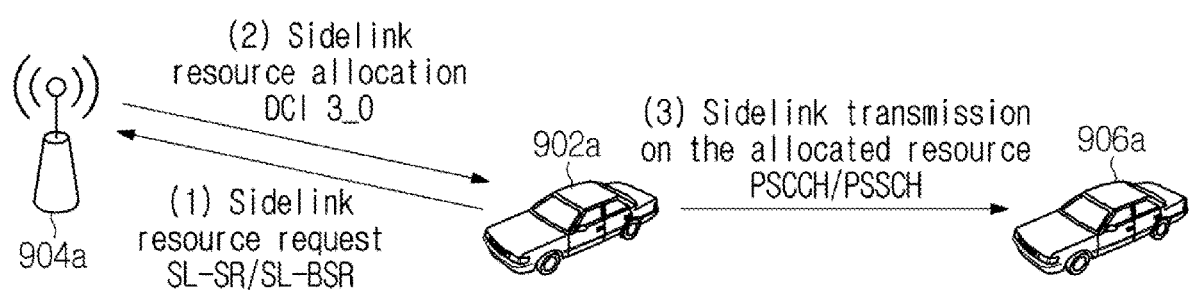
FIG. 9A and FIG. 9B are views showing sidelink transmission.
Figure 9B:
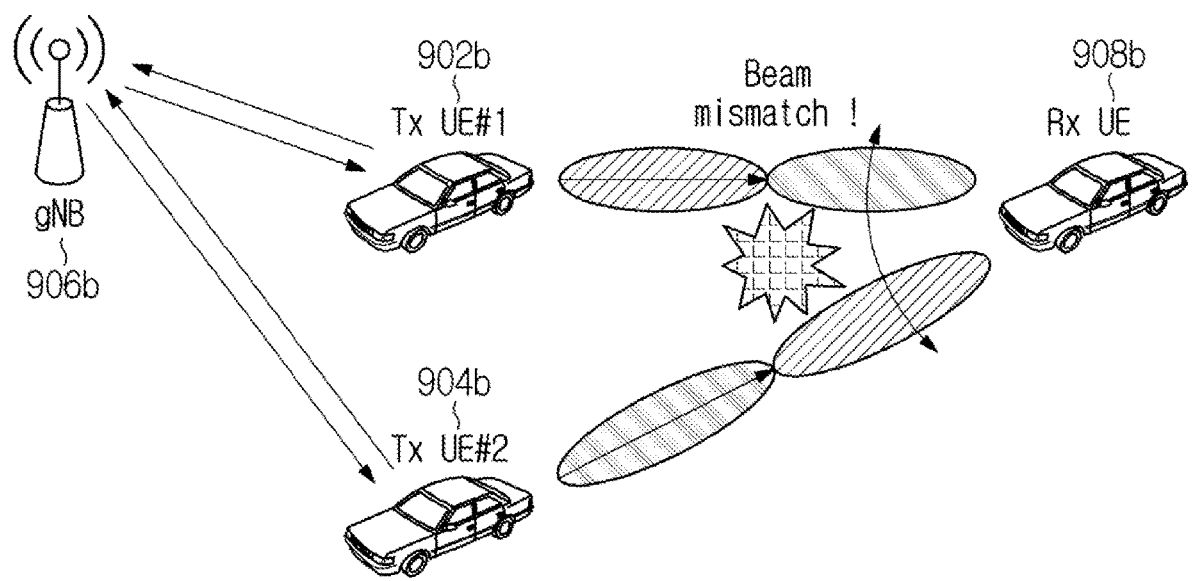

FIG. 9A and FIG. 9B are views showing sidelink transmission. Particularly, FIG. 9A is a view showing a 3GPP new radio (NR) sidelink resource allocation mode 1 (mode 1). The 3GPP NR release 16 (release 16) supports two modes of allocating a resource for data transmission in association with sidelink. Specifically, the 3GPP Rel-16 supports sidelink resource allocation mode 1 and mode 2. The mode 1 (Mode-1) is a scheme in which a sidelink transmission terminal (sidelink Tx user equipment) is scheduled directly by a base station for a resource to be used for data transmission. The mode 2 (Mode-2) is a scheme in which a sidelink transmission terminal itself schedules a resource to be used for data transmission.

Referring to FIG. 9A, a terminal 902a may request a sidelink resource to a base station 904a. As an example, the terminal may transmit a sidelink scheduling request (SL-SR) and a sidelink buffer state report (SL-BSR) to the base station. In response to the sidelink resource request, the base station 904a may allocate a sidelink resource to the terminal 902a. As an example, the base station may allocate a sidelink resource to the terminal based on a DCI3_0 format. Based on the allocated sidelink resource, the terminal 902a may perform sidelink transmission to another terminal 906a. As an example, based on an allocated sidelink resource, a terminal may perform sidelink transmission to a PSCCH and/or PSSCH. As a reception terminal does not know when data is to be transmitted, it may decode a PSCCH on each occasion of a Rx resource pool.

FIG. 9B is a view showing sidelink wireless communication. Particularly, it is a view showing a case in which a terminal communicates by applying beamforming in an mmWave sidelink. Referring to FIG. 9B, a terminal 902b and a terminal 904b are connected with a base station 906b. A reception terminal 908b is connected with the terminal 902b and the terminal 904b. A sidelink reception terminal may not know when and where data will be received. Accordingly, the sidelink reception terminal may attempt a blind decoding of a physical sidelink control channel (PSCCH) on each occasion of a Rx resource pool in order to receive a PSCCH and physical sidelink shared channel (PSSCH) signal.

When a terminal performs beamforming in a sidelink based on mmWave, the terminal may attempt to receive only a beam in a single direction at one moment. Accordingly, when a sidelink reception terminal is connected with multiple transmission terminals by applying beamforming, the sidelink reception terminal cannot receive data without forming a beam in a direction toward a corresponding transmission terminal at a data transmission time. As the sidelink reception terminal does not know when and which transmission terminal will transmit data, it may randomly attempt a beam change in a direction toward each transmission terminal. In this process, the sidelink reception terminal may configure a beam in a different transmission direction at a moment when a transmission terminal transmits data. Thus, there may be a problem that the sidelink reception terminal cannot configure a beam in a direction toward the transmission terminal and not receive the data.

As an example, referring to FIG. 9B, in case the reception terminal 908b configures a beam to the transmission terminal 904b at a moment when the transmission terminal 902b transmits data, the reception terminal 908b may not be able to receive the data from the transmission terminal 902b. Furthermore, the number of connections between a reception terminal and other terminals increases, the occurrence probability of the above-described problem may increase proportionally. When the reception terminal 908b does not make a beam alignment with the transmission terminal 902b at a moment when the transmission terminal 902b performs PSSCH transmission, the reception terminal 908b cannot detect a PSCCH of the transmission terminal 902b. The present disclosure proposes a method that enables a reception terminal to know information on data transmission of a transmission terminal in advance.

Figure 10:
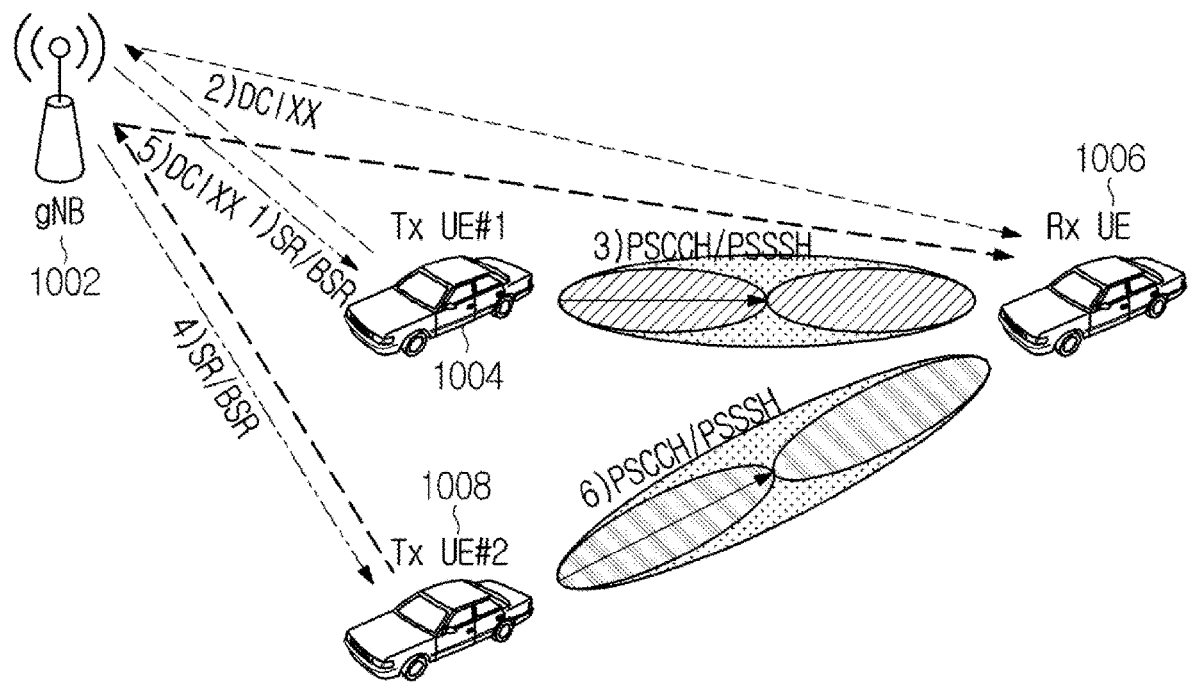
FIG. 10 is a view showing an example of a sidelink communication method applicable to the present disclosure.

FIG. 10 is a view showing an example of a sidelink communication method applicable to the present disclosure. Particularly, FIG. 10 is a view showing a method by which a reception terminal decodes a downlink grant for sidelink data transmission of a transmission terminal. Referring to FIG. 10, it is assumed that a reception terminal 1006 can make a sidelink unicast connection to a transmission terminal 1 1004 and a transmission terminal 2 1008 respectively. In addition, it is assumed that the reception terminal can perform beam alignment and tracking for the transmission 1 1004 and the transmission terminal 2 1008 respectively. In addition, it is assumed that a communication between a base station and a terminal may use an FR1 frequency. That is, it is assumed that a communication between a base station and a terminal may not use beamforming. When data occurs which the transmission terminal 1 1004 will transmit to the reception terminal 1006 via sidelink, the transmission terminal 1 1004 may transmit a scheduling request (SR) and a buffer status report (BSR) to a base station 1002. The base station 1002 may transmit downlink control information (DCI) for sidelink scheduling to the transmission terminal 1 1004 and the reception terminal 1006. The transmission terminal 1 and the reception terminal may decode the received DCI. The transmission terminal 1 may transmit data to the reception terminal based on information on the DCI. Specifically, the transmission terminal 1 may transmit the data to the reception terminal by using a time and a resource that are allocated based on information which is obtained by decoding the DCI. At a time when the transmission terminal 1 transmits the data, the reception terminal may attempt PSCCH blind decoding. Data transmission between the transmission terminal 2 1008 and the reception terminal 1006 may be performed in the same manner as the above-described procedure.

Hereinafter will be described methods by which a reception terminal decodes DCI for sidelink scheduling of a transmission terminal. A base station may perform cyclic redundancy check (CRC) scrambling, when transmitting a physical downlink control channel (PDCCH) that is a DCI transmission channel. A base station may use a RNTI of a sidelink transmission terminal or an ID associated with a sidelink connection as a code used for CRC scrambling.

Hereinafter, a detailed description will be provided from the perspective of a reception terminal. A sidelink reception terminal may use a code used for PDCCH CRC scrambling to decode a PSCCH for sidelink scheduling.

As an example, a sidelink reception terminal may receive DCI of a transmission terminal from a base station, and the sidelink reception terminal may decode the DCI of the transmission terminal based on a common radio network temporary identifier (RNTI). Herein, the common RNTI may be a common RNTI for scrambling DCI of terminals capable of V2X communication. Herein, the common RNTI may be a common RNTI for scrambling DCI of terminals that use an mmWave beam.

As described above, when a sidelink reception terminal decodes DCI of a transmission terminal based on a common RNTI, the DCI may include a source ID field and a destination ID field. In addition, as described above, when a sidelink reception terminal decodes DCI of a transmission terminal based on a common RNTI, the DCI may include a transmission terminal ID (Tx UE ID) field and a reception terminal ID (Rx UE ID) field. As an example, DCI may include a field based on DCI 3_0 extension. Specifically, DCI may include a source ID field and a destination ID field based on DCI 3_0. In addition, DCI may include a transmission terminal ID field and a reception terminal ID field based on DCI 3_0.

As another example, a sidelink reception terminal may receive DCI of a transmission terminal from a base station, and the sidelink reception terminal may decode the DCI of the transmission terminal based on a SL-RNTI of the transmission terminal. In the case of a sidelink connection to a transmission terminal, a sidelink reception terminal may exchange a sidelink RNTI (SL-RNIT) with the transmission terminal. In a process of sidelink connection with a transmission terminal, a sidelink reception terminal may receive a SL-RNTI of the transmission terminal from the transmission terminal. That is, a sidelink reception terminal may obtain a SL-RNTI directly from a transmission terminal without the intervention of a base station. Accordingly, the sidelink reception terminal may decode the DCI of the transmission terminal based on the SL-RNTI of the transmission terminal. However, the DCI may be DCI for another sidelink reception terminal. A sidelink reception terminal may keep as many SL-RNTIs as the number of transmission terminals connected with it. A terminal's CRC checking based on a SL-RNTI may not be complicated. However, a maximum number of sidelink unicast connections of a sidelink reception terminal may be limited.

As described above, when a sidelink reception terminal decodes DCI of a transmission terminal based on a SL-RNTI of the transmission terminal, the DCI may include a destination ID field. As described above, when a sidelink reception terminal decodes DCI of a transmission terminal based on a SL-RNTI of the transmission terminal, the DCI may include a reception terminal ID (Rx UE ID) field. As an example, DCI may include a field based on DCI 3_0 extension. Specifically, DCI may include a destination ID field based on DCI 3_0. In addition, DCI may include a reception terminal ID field based on DCI 3_0.

As yet another example, a sidelink reception terminal may receive DCI of a transmission terminal from a base station, and the sidelink reception terminal may decode the DCI of the transmission terminal based on a sidelink connection specific ID. After a sidelink connection between a sidelink reception terminal and a sidelink transmission terminal, the sidelink transmission terminal may inform a base station of the connection. The sidelink reception terminal may also inform the base station of the connection, and each of the sidelink transmission terminal and the sidelink reception terminal may also inform the base station of the connection. A base station may allocate a sidelink connection specific ID to each sidelink connection. Regarding a sidelink connection specific ID, a sidelink transmission terminal and a sidelink reception terminal may use a single value. In addition, when a sidelink transmission terminal and a sidelink reception terminal exchange the roles, the terminals may use a same sidelink connection specific ID. That is, when a sidelink transmission terminal becomes a reception terminal and a sidelink reception terminal becomes a transmission terminal, a sidelink connection specific ID, which is allocated based on a connection of the terminals, may be used as it is. A sidelink connection specific ID may be used for CRC scrambling and CRC descrambling. For example, based on a sidelink connection specific ID thus allocated, a base station may perform PDCCH CRC scrambling. A terminal may perform PDCCH CRC descrambling based on a sidelink connection specific ID. A specific bit of a sidelink connection specific ID may include data transmission direction information. Herein, the specific bit may be an MSB or LSB. In addition, a specific bit of a sidelink connection specific ID may include role information of a transmission terminal and a reception terminal. Herein, the specific bit may be an MSB or LSB. The above-described information may be utilized when two terminals requests a resource for data transmission to a base station simultaneously or at times that are close to each other.

As described above, when a sidelink reception terminal decodes DCI based on a sidelink connection specific ID, the sidelink reception terminal may know, only through PSCCH descrambling, that the PSCCH corresponds to it. Accordingly, when a sidelink reception terminal decodes DCI of a transmission terminal based on a sidelink connection specific ID, the DCI does not have to further include a source ID field and a destination field. In addition, as described above, when a sidelink reception terminal decodes DCI of a transmission terminal based on a sidelink connection specific ID, the DCI does not have to further include a transmission terminal ID field and a reception terminal ID field. When one or more destination indexes, one or more logical channel group IDs and one or more buffer sizes are included in one sidelink buffer status report (SL-BSR) media access control element (MAC CE), a destination ID or a reception terminal ID may be included in corresponding DCI.

Figure 11:
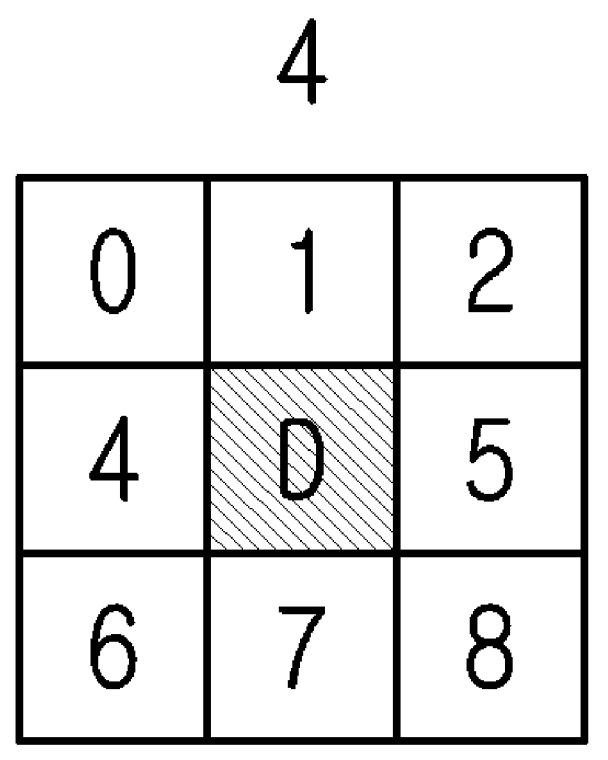

FIG. 11 is a view showing an example of assistance information applicable to the present disclosure. Hereinafter will be described a method for a base station to schedule sidelink transmission from transmission terminals to a sidelink reception terminal. As an example, a base station may know a sidelink reception terminal through a destination index of an SL-BSR MAC CE of 3GPP NR release 16. Thus, the base station may perform scheduling to avoid collision. When a single SL-BSR MAC CE includes a plurality of destination indexes, the operation of a terminal may be a matter of implementation. In addition, a current standard may enable a base station to perform scheduling, thereby avoiding collision thus. No operation of a terminal is defined for a case in which a single SL-BSR MAC CE includes a plurality of destination indexes. Accordingly, as for sidelink, it is necessary to clearly define when and to which terminal a sidelink transmission terminal perform transmission. Accordingly, the above-described problem may be solved by making DCI contain a DCI destination ID field. When a base station adds a DCI destination field to DCI, multiple DCI transmissions may also be possible.

As yet another example, a SL-BSR MAC CE for mmWave sidelink may be newly defined. Specifically, the above-described common RNTI, and a SL-RNTI or sidelink connection specific ID of a transmission terminal may be used as a sidelink reception terminal ID that corresponds to a destination ID index. When a base station adds a DCI destination field to DCI, multiple DCI transmissions may also be possible. That is, when the base station supports multiple destination indexes, DCI may additionally include a destination ID field.

As yet another example, a SL-BSR MAC CE for mmWave sidelink may be newly defined. Specifically, in a multiple sidelink connection environment, in order for a base station to reduce collision or interference of a communication signal between terminals or to efficiently schedule a sidelink transmission resource (frequency, time), a transmission terminal may transmit assistant information while transmitting a SL-BSR. The assistant information may include location information of a sidelink transmission terminal and transmission direction information of the sidelink transmission terminal. In addition, the assistant information may be transmitted by being included in a SL-BSR MAC CE. The location information of a sidelink transmission terminal may be information based on a zone ID. The transmission direction information of a sidelink transmission terminal may be defined beforehand based on a specific direction. For example, referring to FIG. 11, the transmission direction information of a sidelink transmission terminal may be expressed by 4 directions or 8 directions based on north.

A sidelink may have a plurality of unicasts. This may be a general situation of V2X. For example, there may be a unicast of a terminal A and a terminal B, a unicast of a terminal C and a terminal D, and a unicast of a terminal E and a terminal F. When each of the unicasts is in a different direction, since a beam is used for sidelink communication, the unicasts may not affect each other. Accordingly, the location information of a terminal and data transmission/reception direction information may be beneficial to efficient scheduling of a resource. Specifically, since a base station or a terminal can allocate a same frequency resource at a same time, the resource may be efficiently used.

When a sidelink transmission terminal wants to transmit data to a plurality of sidelink reception terminals, the transmission terminal may transmit a plurality of destination indexes and relevant information by transmitting a single SL-BRS to a base station. When a sidelink transmission terminal transmits data to a plurality of sidelink reception terminals located in a same direction, the transmission terminal may transmit a plurality of destination indexes and relevant information by transmitting a single SL-BRS to a base station. In this case, the base station may transmit a single piece of DCI by adding a plurality of destination IDs or reception terminal IDs to the DCI. In addition, in this case, the base station may transmit a multiple pieces of DCI and multiple PSCCHs to frequency division multiplexing (FDM).

Figure 12:
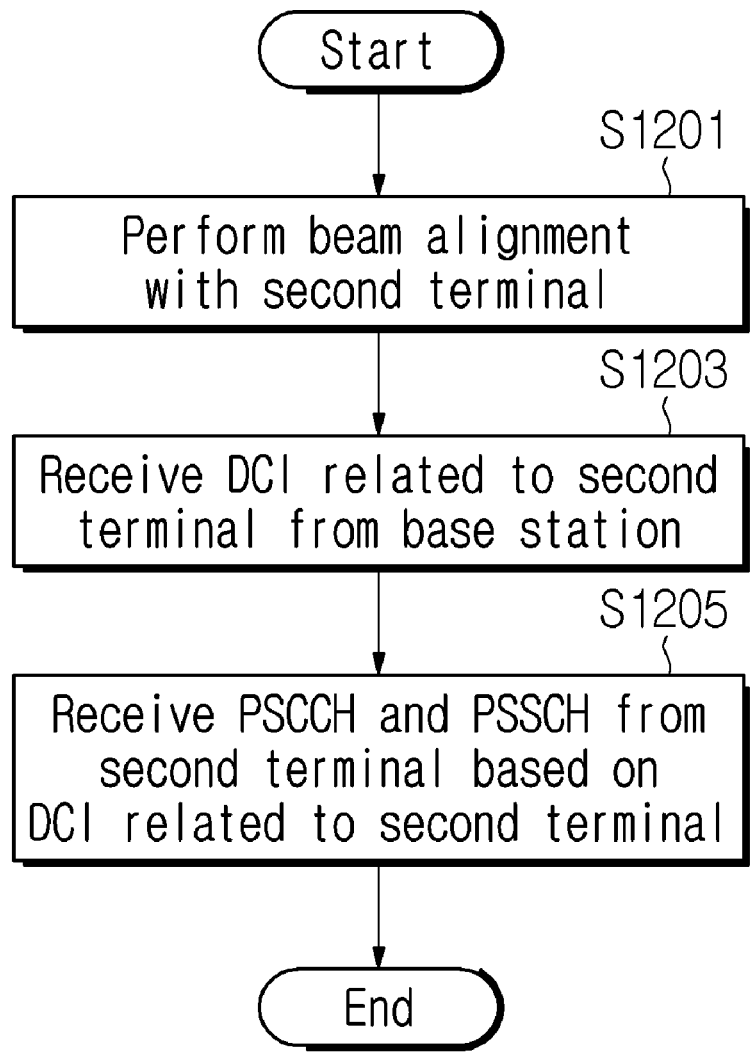
FIG. 12 is a view showing an example of an operation procedure of a sidelink reception terminal applicable to the present disclosure.

FIG. 12 is a view showing an example of an operation procedure of a sidelink reception terminal applicable to the present disclosure. Referring to FIG. 12, a first terminal may mean a sidelink reception terminal. A second terminal may mean a sidelink transmission terminal. At step S1201, the first terminal may perform beam alignment with the second terminal. That is, the sidelink reception terminal and the sidelink transmission terminal may perform beam alignment.

At step S1203, the first terminal may receive DCI associated with the second terminal from a base station. Herein, the DCI may be decoded based on at least one of a common radio network temporary identifier (RNTI), a sidelink-RNTI (SL-RNTI) of the second terminal, and a sidelink connection specific ID.

As an example, the first terminal may receive DCI of the second terminal from the base station, and the first terminal may decode the DCI associated with the second terminal based on a common radio network temporary identifier (RNTI). Herein, the common RNTI may be a common RNTI for scrambling DCI of terminals capable of V2X communication. Herein, the common RNTI may be a common RNTI for scrambling DCI of terminals that use an mmWave beam.

As described above, when the first terminal decodes the DCI associated with the second terminal based on the common RNTI, the DCI may include a source ID field and a destination ID field. In addition, as described above, when the first terminal decodes the DCI of the transmission terminal based on the common RNTI, the DCI may include a first terminal ID field and a second terminal ID field. As an example, the DCI may include an additional field based on DCI 3_0 extension. Specifically, the DCI may further include a source ID field and a destination ID field based on DCI 3_0. In addition, the DCI may further include a transmission terminal ID and a reception terminal ID based on DCI 3_0.

As yet another example, the first terminal may receive DCI associated with the second terminal from the base station, and the first terminal may decode the DCI of the second terminal based on a SL-RNTI of the second terminal. During a sidelink connection to the second terminal, the first terminal may exchange a sidelink RNTI (SL-RNTI) with a transmission terminal. For example, the first terminal and the second terminal may exchange a RNTI based on beam alignment. In a sidelink connection process with the second terminal, the first terminal may receive a SL-RNTI of the second terminal from the second terminal. That is, the first terminal may obtain a SL-RNTI directly from the second terminal without the intervention of the base station. Accordingly, the first terminal may decode DCI associated with the second terminal based on the SL-RNTI of the second terminal. However, the DCI may be DCI for another sidelink reception terminal. The first terminal may keep as many SL-RNTIs as the number of sidelink transmission terminals connected with it. A terminal's CRC checking based on a SL-RNTI may not be complicated. However, a maximum number of sidelink unicast connections of the first terminal may be limited.

As described above, when the first terminal decodes the DCI associated with the second terminal based on the SL-RNTI of the second terminal, the DCI may include a destination ID field. As described above, when the first terminal decodes the DCI associated with the second terminal based on the SL-RNTI of the second terminal, the DCI may include a first terminal ID field. As an example, the DCI may include a field based on DCI 3_0 extension. Specifically, the DCI may include a destination ID field based on DCI 3_0. In addition, the DCI may include the first terminal ID field based on DCI 3_0.

As yet another example, the first terminal may receive the DCI of the second terminal from the base station, and the first terminal may decode the DCI associated with the second terminal based on a sidelink connection specific ID. After the first terminal and the second terminal make a sidelink connection, the second terminal may inform the base station of the connection. The first terminal may also inform the base station of the connection, and the first terminal and the second terminal may inform the base station of the connection respectively. For example, the first terminal may transmit sidelink unicast connection information associated with the beam alignment with the second terminal to the base station. The base station may allocate a sidelink connection specific ID to each sidelink connection.

Regarding a sidelink connection specific ID, the first terminal and the second terminal may use a single value. In addition, when the first terminal and the second terminal exchange the roles, the first terminal and the second terminal may use a same sidelink connection specific ID. That is, when a sidelink transmission terminal becomes a reception terminal and a sidelink reception terminal becomes a transmission terminal, a sidelink connection specific ID, which is allocated based on a connection of the terminals, may be used as it is. A sidelink connection specific ID may be used for CRC scrambling and CRC descrambling. For example, based on a sidelink connection specific ID thus allocated, a base station may perform PDCCH CRC scrambling. A terminal may perform PDCCH CRC descrambling based on a sidelink connection specific ID. A specific bit of a sidelink connection specific ID may include data transmission direction information. Herein, the specific bit may be a most significant bit (MSB) or a last significant bit (LSB). In addition, a specific bit of a sidelink connection specific ID may include role information of a transmission terminal and a reception terminal. Herein, the specific bit may be an MSB or LSB. The above-described information may be utilized when two terminals request a resource for data transmission to a base station simultaneously or at times that are close to each other.

As described above, when the first terminal decodes DCI associated with a third terminal based on a sidelink connection specific ID, the first terminal may perform PSCCH descrambling and know that the PSCCH corresponds to the first terminal. Accordingly, when the first terminal decodes DCI associated with the second terminal based on a sidelink connection specific ID, the DCI does not have to further include a source ID field and a destination field. When one or more destination indexes, one or more logical channel group IDs and one or more buffer sizes are included in one sidelink buffer status report (SL-BSR) media access control control element (MAC CE), a destination ID or a reception terminal ID may be included in corresponding DCI.

At step S1205, the first terminal may receive a PSSCH and a PSSCH from the second terminal based on the DCI associated with the second terminal. The first terminal may know when and where data will be transmitted, based on the DCI information of the second terminal. Accordingly, the first terminal may form a reception beam at a corresponding time in a corresponding direction. In addition, the first terminal may perform PSCCH blind decoding only at a PSCCH and PSSCH transmission time. In addition, in an existing method of allocating a sidelink resource, the mode 1 of transmitting DCI to a transmission terminal may be utilized as it is.

Figure 13:
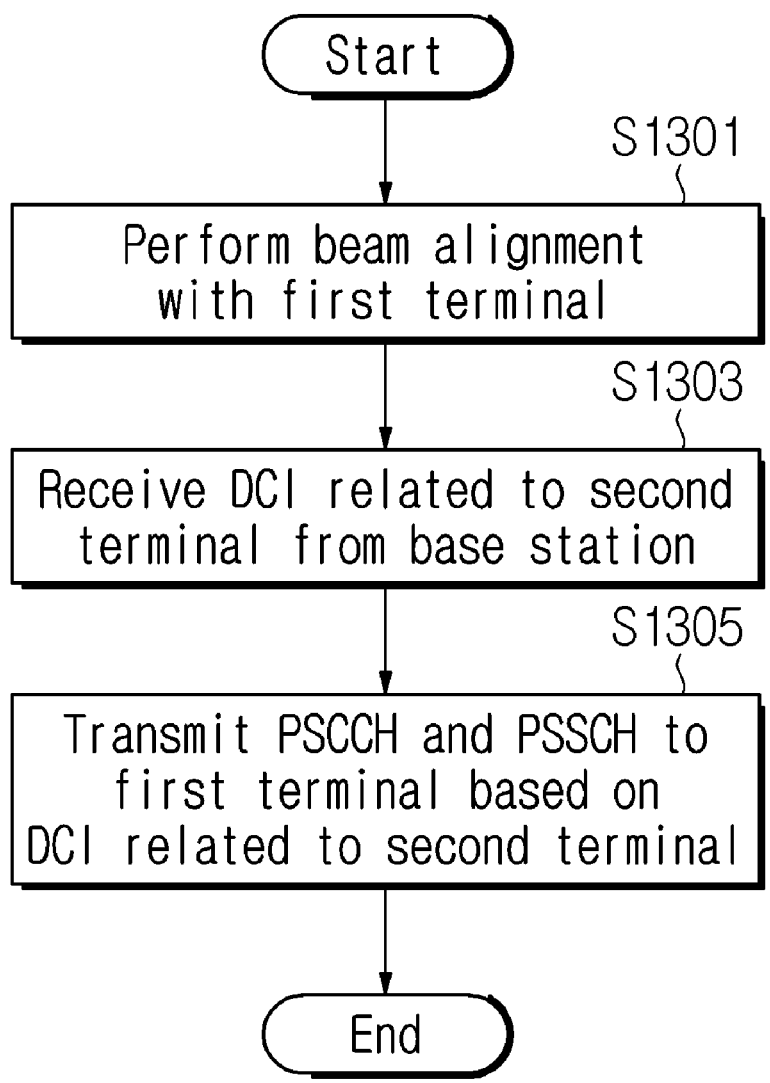
FIG. 13 is a view showing an example of a sidelink transmission terminal procedure that is applicable to the present disclosure.

FIG. 13 is a view showing an example of a sidelink transmission terminal procedure that is applicable to the present disclosure. Referring to FIG. 13, a first terminal may mean a sidelink reception terminal. A second terminal may mean a sidelink transmission terminal. At step S1301, the first terminal may perform beam alignment with the second terminal. That is, the sidelink reception terminal and the sidelink transmission terminal may perform beam alignment.

At step S1303, the second terminal may receive DCI associated with the second terminal from a base station. Specifically, the second terminal may transmit a sidelink scheduling request (SL-SR) and a sidelink buffer state report (SL-BSR) to the base station.

While transmitting the SL-BSR to the base station, the second terminal may deliver assistant information together. The second terminal may transmit a SL-BSR MAC CE by including information for multiple unicast scheduling in the SL-BSR MAC CE. As an example, the second terminal may transmit a SL-BSR MAC CE by including location information of the second terminal and/or transmission direction information of the second terminal in the SL-BSR MAC CE. The location information of the second terminal may be based on a zone ID. A transmission direction may be defined beforehand based on a specific direction. The base station may perform sidelink data transmission scheduling based on the received information. In addition, the second terminal may transmit a plurality of destination indexes through a single SL-BRS that is transmitted to the base station. In this case, the base station may transmit a single piece of DCI by adding a plurality of destination ID fields or first terminal ID fields to the DCI. In addition, the base station may transmit multiple pieces of DCI or a plurality of PSCCHs to FDM.

The base station may transmit DCI associated with the second terminal to the first terminal and the second terminal. The second terminal may receive the DCI associated with the second terminal from the base station. Herein, the DCI may be decoded based on at least one of a common radio network temporary identifier (RNTI), a sidelink-RNTI (SL-RNTI) of the second terminal, and a sidelink connection specific ID.

As an example, the second terminal may transmit the SL-RNTI of the second terminal to the first terminal. For example, based on the beam alignment, the second terminal may transmit the SL-RNTI of the second terminal to the first terminal. Specifically, the second terminal may exchange a SL-RNTI with the first terminal during a sidelink unicast connection. The first terminal may receive the DCI associated with the second terminal from the base station. In addition, the first terminal may decode the DCI associated with the second terminal based on the SL-RNTI of the second terminal that is received from the second terminal. Accordingly, the first terminal may know when and in which direction the second terminal will perform sidelink transmission. Herein, the DCI may include a destination ID field or a first terminal ID field.

As an example, the second terminal may decode the DCI based on a common RNTI. Herein, the common RNTI thus used may mean a common RNTI for V2X terminals. Herein, the DCI may include a source ID field and a destination ID field. In addition, the DCI may include a first terminal ID field and a second terminal ID field.

As an example, the second terminal may decode the DCI associated with the second terminal based on a sidelink connection specific ID. Specifically, the second terminal may transmit sidelink unicast connection information associated with the beam alignment with the first terminal to the base station. The base station may allocate an ID to a unicast connection between the first terminal and the second terminal. The base station may perform scrambling based on the ID thus allocated. The second terminal may decode the DCI based on a sidelink connection specific ID associated with beam alignment.

At step S1305, the second terminal may transmit a PSSCH and a PSSCH to the first terminal based on the DCI associated with the second terminal. Based on DCI received from the base station, a sidelink transmission terminal may perform sidelink transmission to a sidelink reception terminal.

Figure 14:
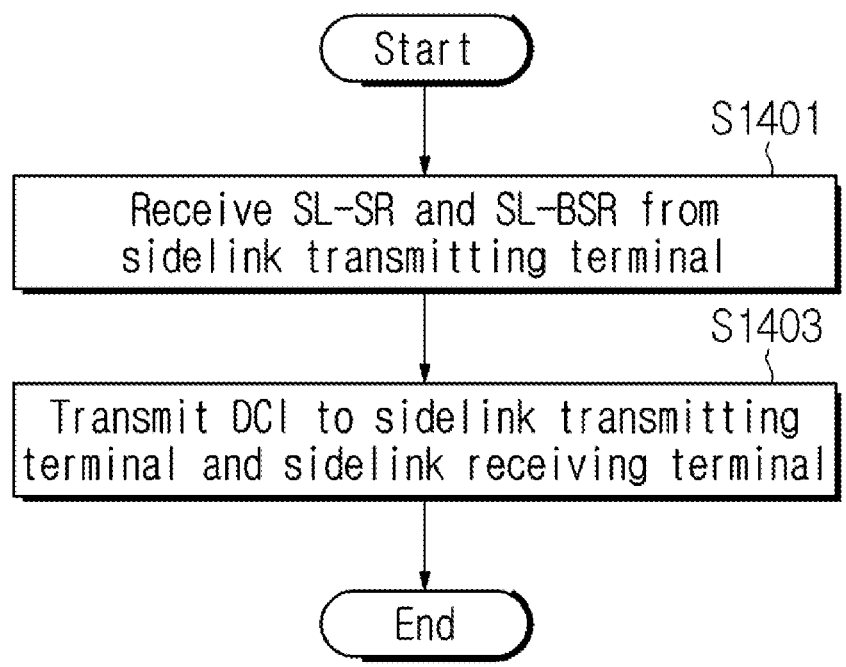
FIG. 14 is a view showing an example of an operation procedure of a base station which is applicable to the present disclosure.

FIG. 14 is a view showing an example of an operation procedure of a base station which is applicable to the present disclosure. At step S1401, the base station may receive a SL-SR and a SL-BSR from a sidelink transmission terminal. The base station may perform cyclic redundancy check (CRC) scrambling, when transmitting a physical downlink control channel (PDCCH) that is a DCI transmission channel. The base station may use at least one of a common RNTI, a RNIT of a sidelink transmission terminal, and an ID associated with a sidelink connection, as a code used for CRC scrambling.

In addition, when receiving a SL-BSR from the sidelink transmission terminal, the base station may receive assistant information together. The assistant information may include location information and/or transmission direction information of the sidelink transmission terminal. Based on the received information, the base station may efficiently allocate a resource. In addition, the base station may receive a plurality of destination indexes from the sidelink transmission terminal through a single SL-BSR. In this case, the base station may add a plurality of destination ID fields or sidelink reception terminal ID fields to a single piece of DCI.

At step S1403, the base station may transmit the DCI to the sidelink transmission terminal and the sidelink reception terminal. That is, the base station may transmit the DCI associated with the second terminal to the first terminal and the second terminal. The first terminal may receive and decode the DCI associated with the second terminal. Based on the received DCI, the second terminal may perform sidelink transmission to the first terminal.

Systems and Various Devices to which Embodiments of the Present Disclosure are Applicable Various embodiments of the present disclosure may be combined with each other.

Hereinafter, a device will be described to which various embodiments of the present disclosure is applicable. Although not limited thereto, various descriptions, functions, procedures, proposals, methods and/or operation flowcharts disclosed in this document are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 15:
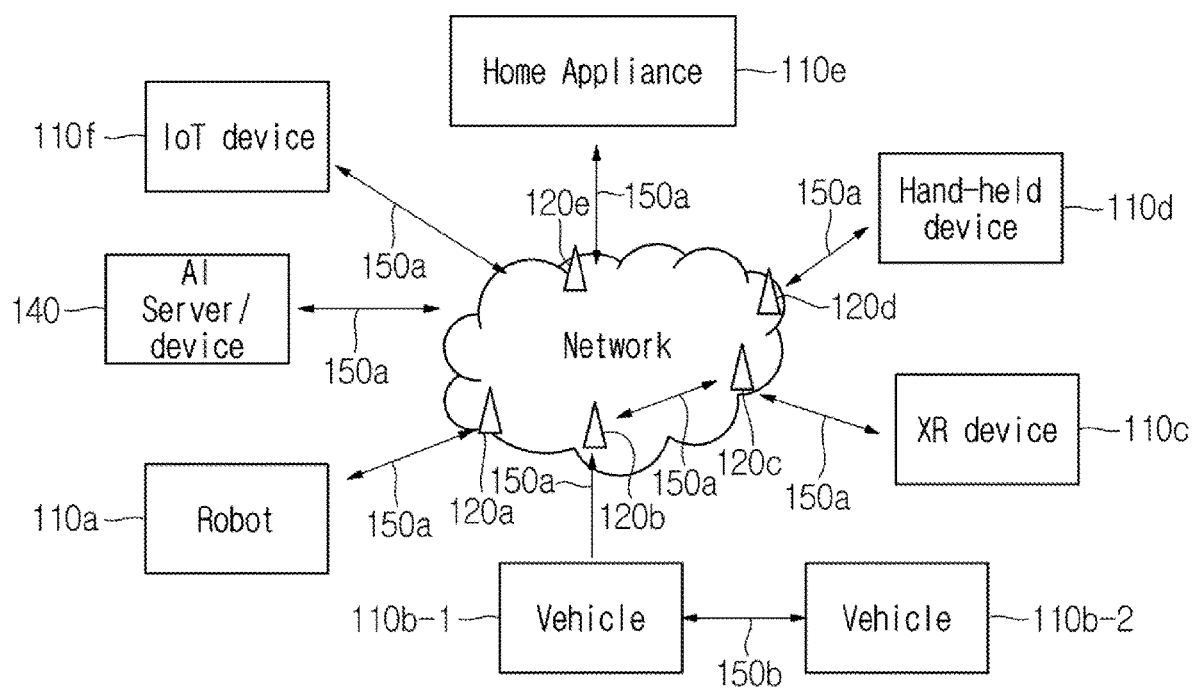
FIG. 15 illustrates an example of a communication system according to an embodiment of the present disclosure.

FIG. 15 illustrates an example of a communication system according to an embodiment of the present disclosure. An embodiment of FIG. 19 may be combined with various embodiments of the present disclosure.

Referring to FIG. 15, a communication system, which is applicable to the present disclosure, includes a wireless device, a base station, and a network. Herein, the wireless device means a device, which performs communication using a radio access technology (e.g., 5G NR, LTE), and may be referred to as communication/radio/5G device. The wireless device may include, without being limited to, at least one of a robot 110a, vehicles 110b-1 and 110b-2, an extended reality (XR) device 110c, a hand-held device 110d, a home appliance 110e, an Internet of Things (IoT) device 110f, and an artificial intelligence (AI) device/server 110g. For example, the vehicles may include a vehicle having a wireless communication function, an autonomous vehicle, and a vehicle capable of performing vehicle-to-vehicle communication. Herein, the vehicles 110b-1 and 110b-2 may include an unmanned aerial vehicle (UAV) (e.g., a drone). The XR device 110c may include an augmented Reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device 110d may include a smartphone, a smartpad, a wearable device (e.g., a smartwatch or a smartglasses), and a computer (e.g., a notebook). The home appliance 110e may include a TV, a refrigerator, and a washing machine. The IoT device 110f may include a sensor and a smartmeter. For example, the base stations 120a to 120e and the network may be implemented as wireless devices and a specific wireless device 120a may operate as a base station/network node with respect to other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 100a to 100f of the present specification may perform communication based on the LTE-M technology. In this case, as an example, the LTE-M technology may be an example of an LPWAN technology, and may be called various names such as enhanced machine type communication (eMTC). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 100a to 100f of the present specification may include at least any one of ZigBee, Bluetooth, and Low Power Wide Area Network (LPWAN) in consideration of low power communication, without being limited to the above-described names. For example, the ZigBee technology may create PAN (personal area networks) related to small/low-power digital communication based on various standards such as IEEE 802.15.4, and may be called by various names.

The wireless devices 100a to 100f may be connected to a network via the base stations 120a to 120e. An AI technology may be applied to the wireless devices 100a to 100f, and the wireless devices 100a to 100f may be connected to the AI server 110g via a network. The network may be configured using a 3G network, a 4G (e.g., LTE) network, or a 5G (e.g., NR) network. Although the wireless devices 100a to 100f may communicate with each other through the base stations 120a to 120e/network, the wireless devices 100a to 100f may perform direct communication (e.g., sidelink communication) with each other without the base stations 120a to 120e/network. For example, the vehicles 110b-1 and 110b-2 may perform direct communication (e.g., Vehicle-to-Vehicle (V2V)/Vehicle-to-everything (V2X) communication). In addition, the IoT device 110f (e.g., a sensor) may perform direct communication with other IoT devices (e.g., sensors) or other wireless devices 101a to 110f.

Wireless communication/connections 150a, 150b and 150c may be established between the wireless devices 110a to 110f and the base stations 120a to 120e and between the base stations 120a to 120e and the base stations 120a to 120e. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and?150b. For example, the wireless communication/connections 150a and?150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
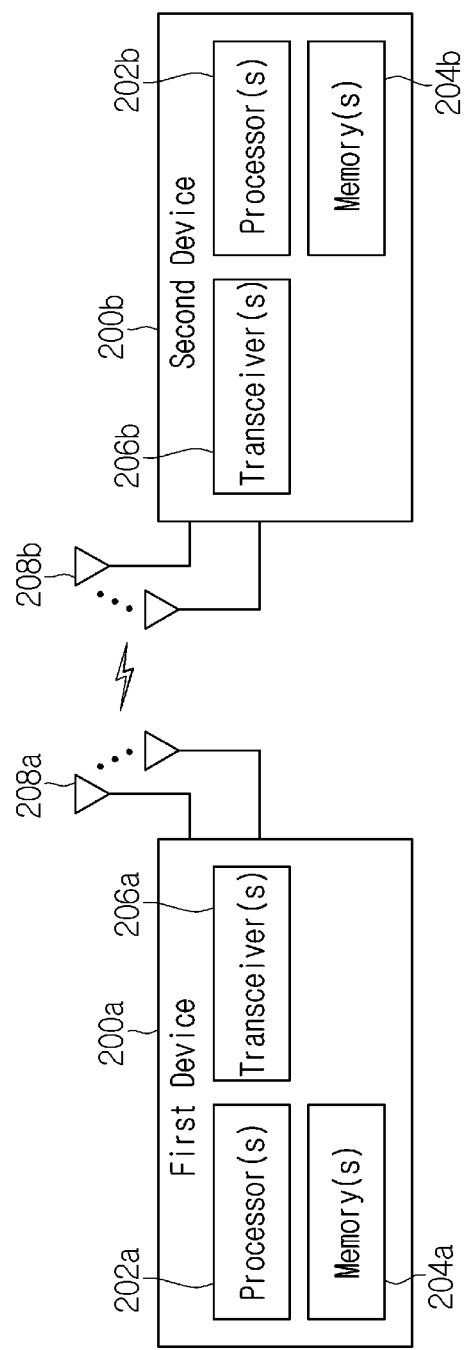
FIG. 16 illustrates an example of a wireless device according to an embodiment of the present disclosure.

FIG. 16 illustrates an example of a wireless device according to an embodiment of the present disclosure. An embodiment of FIG. 16 may be combined with various embodiments of the present disclosure.

Referring to FIG. 16, a first wireless device 200a and a second wireless device 200b may transmit and receive radio signals through various radio access technologies (e.g., LTE and NR). Herein, {the first wireless device 200a and the second wireless device 200b} may correspond to {the wireless device 110x and the base station 120x} and/or {the wireless device 110x and the wireless device 110x} of FIG. 15.

The first wireless device 200a may include one or more processors 202a and one or more memories 204a and additionally further include one or more transceivers 206a and/or one or more antennas 208a. The processor(s) 202a may control the memory(s) 204a and/or the transceiver(s) 206a and may be configured to implement the descriptions, functions, procedures, proposals, methods, and/or operational flowcharts disclosed in this document. For example, the processor(s) 202a may process information within the memory(s) 204a to generate first information/signals and then transmit radio signals including the first information/signals through the transceiver(s) 206a. In addition, the processor(s) 202a may receive radio signals including second information/signals through the transceiver 206a and then store information obtained by processing the second information/signals in the memory(s) 204a. The memory(s) 204a may be connected to the processor(s) 202a and may store various information related to operations of the processor(s) 202a. For example, the memory(s) 204a may store software code including commands for performing a part or the entirety of processes controlled by the processor(s) 202a or for performing the descriptions, functions, procedures, proposals, methods, and/or operational flowcharts disclosed in this document. Herein, the processor(s) 202a and the memory(s) 204a may be a part of a communication modem/circuit/chip designed to implement RAT (e.g., LTE or NR). The transceiver(s) 206a may be connected to the processor(s) 202a and transmit and/or receive radio signals through one or more antennas 208a. Each of the transceiver(s) 206a may include a transmitter and/or a receiver. The transceiver(s) 206a may be used interchangeably with a radio frequency (RF) unit. In the present disclosure, the wireless device may represent a communication modem/circuit/chip.

As an example, a first wireless device may mean the first terminal. Specifically, a first wireless device may include a transceiver and a processor coupled with the transceiver. The processor may control to perform beam alignment with the second terminal. The processor may control the transceiver to receive downlink control information (DCI) associated with the second terminal from the base station. Herein, the DCI may be decoded based on at least one of a common radio network temporary identifier (RNTI), a sidelink-RNTI (SL-RNTI) of the second terminal, and a sidelink connection specific ID. The processor may control the transceiver to receive a physical sidelink control channel (PSCCH) and a physical sidelink shared channel (PSSCH) from the second terminal based on the DCI. Herein, a first terminal may mean sidelink receiving terminal. In addition, a second terminal may mean sidelink transmitting terminal.

As another example, a first wireless device may mean the second terminal. Specifically, a first wireless device may include a transceiver and a processor coupled with the transceiver. The processor may perform a beam alignment with a first terminal. The processor may control the transceiver to transmit a sidelink scheduling request (SL-SR) and a sidelink buffer status report (SL-BSR) to a base station. The processor may control to receive downlink control information (DCI) associated with the second terminal from the base station. Herein, the DCI may be decoded based on at least one of a common radio network temporary identifier (RNTI), a sidelink-RNTI (SL-RNTI) of the second terminal, and a sidelink connection specific ID. The processor may control the transceiver to transmit a physical sidelink control channel (PSCCH) and a physical sidelink shared channel (PSSCH) to the first terminal based on the DCI.

As another example, a first wireless device may mean a device that includes at least one processor and at least one memory functionally coupled with the at least one processor. The at least one processor may control the device to perform beam alignment with a sidelink transmission terminal. In addition, the processor may control the device to receive downlink control information (DCI) associated with the sidelink transmission terminal from a base station. Herein, the DCI may be decoded based on at least one of a common radio network temporary identifier (RNTI), a sidelink-RNTI (SL-RNTI) of the second terminal, and a sidelink connection specific ID. The at least one processor may control the device to receive a physical sidelink control channel (PSCCH) and a physical sidelink shared channel (PSSCH) from the sidelink transmission terminal based on the DCI.

The second wireless device 200b performs wireless communication with the first wireless device 200a, and includes one or more processors 202b and one or more memories 204b and may additionally include one or more transceivers 206b and/or one or more antennas 208b. The functions of the one or more processors 202b, one or more memories 204b, one or more transceivers 206b, and/or one or more antennas 208b are similar to the one or more processors 202a, one or more memories 204a, one or more transceivers 206a and/or one or more antennas 208a of the first wireless device 200a.

As an example, a second wireless device may include a transceiver and a processor coupled with the transceiver. The processor may control the transceiver to receive at least one discovery signal having each beam direction. In addition, the processor may control transmission of a discovery response signal to a terminal that has transmitted the at least one discovery signal. The discovery signal may include a synchronization signal and a discovery message.

Hereinafter, hardware elements of the wireless devices 200a and 200b will be described more specifically. One or more protocol layers may be implemented by, without being limited to, the one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), a message, control information, data or information according to the descriptions, functions, procedures, proposals, methods, and/or operational flowcharts disclosed in this document. The one or more processors 202a and 202b may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 206a and 206b. The one or more processors 202a and 202b may receive the signals (e.g., baseband signals) from the one or more transceivers 206a and 206b and acquire the PDUs, SDUs, messages, control information, data, or information according to the descriptions, functions, procedures, proposals, methods, and/or operational flowcharts disclosed in this document.

The one or more processors 202a and 202b may be referred to as controllers, microcontrollers, microprocessors, or microcomputers. The one or more processors 202a and 202b may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 202a and 202b. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 202a and 202b or stored in the one or more memories 204a and 204b so as to be driven by the one or more processors 202a and 202b. The descriptions, functions, procedures, proposals, methods, and/or operational flowcharts disclosed in this document may be implemented using firmware or software in the form of code, commands, and/or a set of commands.

As an example, a wireless device may mean a non-transitory computer-readable medium that stores at least one instruction. The computer-readable medium may include the at least one instruction that is executable by a processor. The at least one instruction may instruct the computer-readable medium to perform beam alignment with a sidelink transmission terminal. It may instruct the computer-readable medium to receive downlink control information (DCI) associated with the sidelink transmission terminal from a base station. Herein, the DCI may be decoded based on at least one of a common radio network temporary identifier (RNTI), a sidelink-RNTI (SL-RNTI) of the second terminal, and a sidelink connection specific ID. The at least one instruction may instruct the computer-readable medium to receive a physical sidelink control channel (PSCCH) and a physical sidelink shared channel (PSSCH) from the sidelink transmission terminal based on the DCI.

The one or more memories 204a and 204b may be connected to the one or more processors 202a and 202b and store various types of data, signals, messages, information, programs, code, instructions, and/or commands. The one or more memories 204a and 204b may be configured by a read only memory (ROM), a random access memory (RAM), an erasable programmable read only memory (EPROM), a flash memory, a hard drive, a register, a cash memory, a computer-readable storage media, and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit user data, control information, and/or radio signals/channels, mentioned in the methods and/or operational flowcharts of this document, to one or more other devices. The one or more transceivers 206a and 206b may receive user data, control information, and/or radio signals/channels, mentioned in the descriptions, functions, procedures, proposals, methods, and/or operational flowcharts disclosed in this document, from one or more other devices. In addition, the one or more transceivers 206a and 206b may be connected to the one or more antennas 208a and 208b, and the one or more transceivers 206a and 206b may be configured to transmit and receive user data, control information, and/or radio signals/channels, mentioned in the descriptions, functions, procedures, proposals, methods, and/or operational flowcharts disclosed in this document, through the one or more antennas 208a and 208b. In this document, the one or more antennas may be a plurality of physical antennas or a plurality of logical antennas (e.g., antenna ports). The one or more transceivers 206a and 206b may convert received radio signals/channels, etc., from RF band signals into baseband signals in order to process received user data, control information, radio signals/channels, etc., using the one or more processors 202a and 202b. The one or more transceivers 206a and 206b may convert the user data, control information, radio signals/channels, etc., processed using the one or more processors 202a and 202b from the base band signals into the RF band signals. To this end, the one or more transceivers 206a and 206b may include (analog) oscillators and/or filters.

Figure 17:
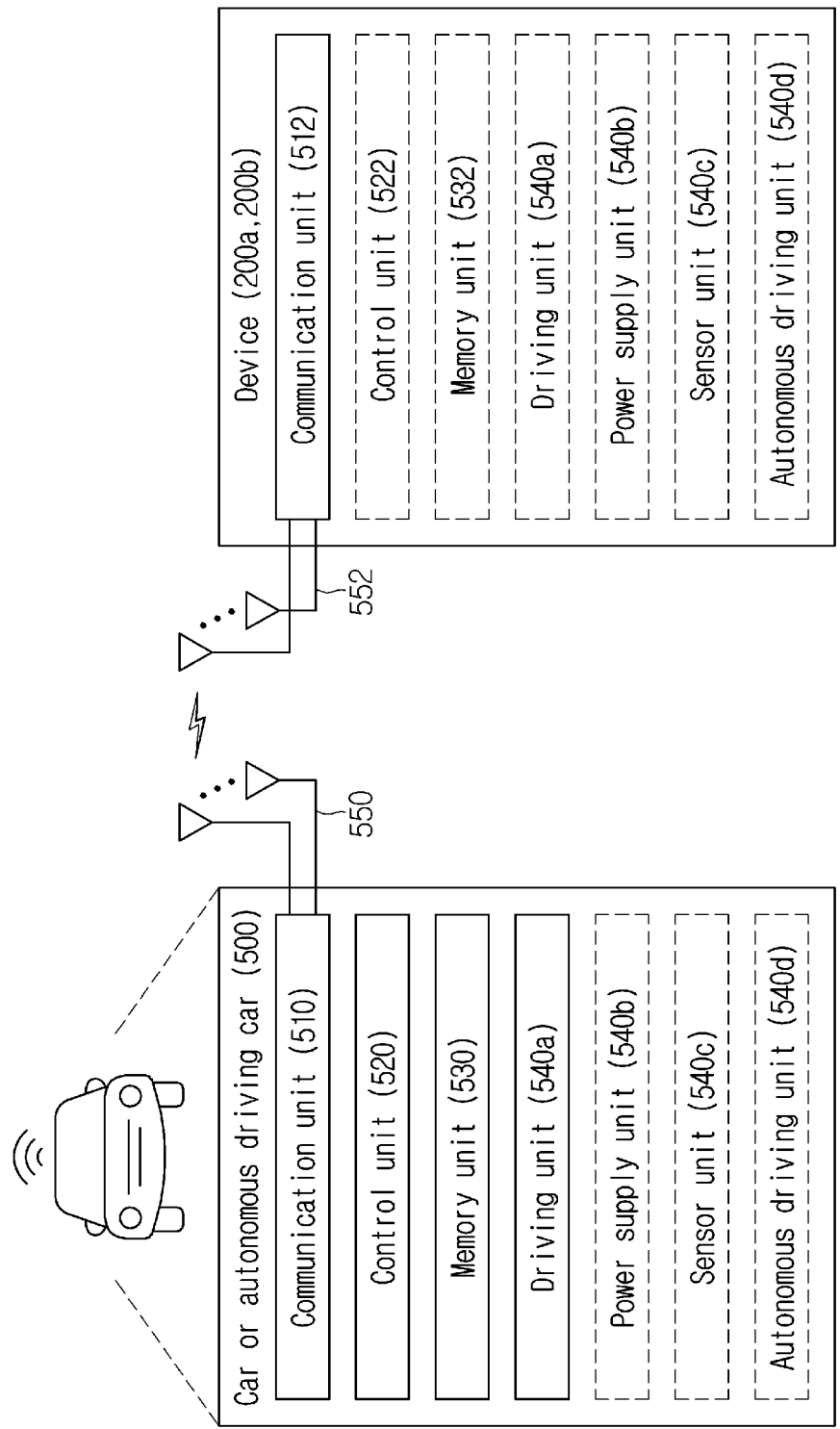
FIG. 17 illustrates an example of a vehicle or an autonomous vehicle according to an embodiment of the present disclosure.

FIG. 17 illustrates an example of a vehicle or an autonomous vehicle according to an embodiment of the present disclosure. FIG. 17 illustrates a vehicle or autonomous vehicle that is applied to the present disclosure. The vehicle or autonomous vehicle may be implemented by a mobile robot, a car, a train, a manned/unmanned aerial vehicle (AV), a ship and the like but is not limited to a vehicle form. An embodiment of FIG. 17 may be combined with various embodiments of the present disclosure.

Referring to FIG. 17, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 650 may be configured as a part of the communication unit 610.

The communication unit 610 may transmit and receive signals (e.g., data and control signals) to and from external devices such as other vehicles, base stations (e.g., base stations and road side units), and servers. The control unit 620 may perform various operations by controlling elements of the vehicle or the autonomous vehicle 100. The control unit 120 may include an electronic control unit (ECU). The driving unit 640a may cause the vehicle or autonomous vehicle 600 to drive on a road. The driving unit 640a may include an engine, a motor, a powertrain, a wheel, a brake, a steering device, etc. The power supply unit 640b may supply power to the vehicle or autonomous vehicle 600 and include a wired/wireless charging circuit, a battery, etc. The sensor unit 640c may acquire a vehicle state, ambient environment information, user information, etc. The sensor unit 640c may include an inertial measurement unit (IMU)

sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or autonomous vehicle 600 may move along the autonomous driving path according to the driving plan (e.g., speed/direction control). In the middle of autonomous driving, the communication unit 610 may aperiodically/periodically acquire recent traffic information data from the external server and acquire surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

Industrial Applicability

Embodiments of the present disclosure are applicable to various wireless access systems. As examples of the various wireless access systems, there are 3rd Generation Partnership Project (2GPP), 3GPP2 and the like.

Embodiments of the present disclosure are applicable not only to the various wireless access systems but also to all technical fields utilizing the various wireless access systems. Furthermore, the proposed method may be applied to mmWave and THz Wave communication systems using very high frequency.

Additionally, embodiments of the present disclosure may be applied to various applications like autonomous cars and drones.

What is claimed is:

1. A method of operating a first terminal in a wireless communication system, the method comprising:
    transmitting a sidelink synchronization signal (SLSS) to a second terminal, wherein the SLSS includes a primary sidelink synchronization signal (PSSS) and a secondary sidelink synchronization signal (SSSS);
    performing, by the first terminal, a beam alignment a connection with the second terminal based on information related to a beam alignment;
    receiving, by the first terminal, downlink control information (DCI) related to the second terminal from a base station, wherein the DCI is decoded based on at least one of a sidelink-radio network temporary identifier (SL-RNTI) of the second terminal or a sidelink connection specific ID;
    obtaining, from the DCI, information on a time resource for transmitting a physical sidelink control channel (PSCCH) and a physical sidelink shared channel (PSSCH) by the second terminal; and
    receiving, by the first terminal, the PSCCH and the PSSCH from the second terminal based on the DCI,
    wherein the sidelink connection specific ID includes at least one of information on roles of the first terminal and the second terminal or information on data transmission direction,
    wherein the PSCCH and the PSSCH are received based on Rx beamforming, and
    wherein the Rx beamforming is performed based on the time resource and to a direction of the second terminal determined based on the beam alignment.

2. The method of claim 1, wherein the SL-RNTI of the second terminal is received from the second terminal based on the beam alignment, and
    wherein the DCI is decoded based on the SL-RNTI of the second terminal.

3. The method of claim 2, wherein the DCI includes a destination ID field.

4. The method of claim 1, wherein the first terminal transmits sidelink unicast connection information related to the beam alignment to the base station, and
    wherein the DCI is decoded based on the sidelink connection specific ID related to the beam alignment.

5. The method of claim 1, wherein the DCI is decoded based on a common RNTI, and
    wherein the DCI includes a source ID field and a destination ID field.

6. A method of operating a second terminal in a wireless communication system, the method comprising:
    receiving a sidelink synchronization signal (SLSS) from a first terminal, wherein the SLSS includes a primary sidelink synchronization signal (PSSS) and a secondary sidelink synchronization signal (SSSS);
    performing, by the second terminal, a beam alignment a connection with the first terminal based on information related to a beam alignment;
    transmitting, by the second terminal, a sidelink scheduling request (SL-SR) and a sidelink buffer status report (SL-BSR) to a base station;
    receiving, by the second terminal, downlink control information (DCI) related to the second terminal from the base station, wherein the DCI is decoded based on at least one of a sidelink-radio network temporary identifier (SL-RNTI) of the second terminal or a sidelink connection specific ID; and transmitting, by the second terminal, a physical sidelink control channel (PSCCH) and a physical sidelink shared channel (PSSCH) to the first terminal using a time resource indicated by the DCI, wherein the sidelink connection specific ID includes at least one of information on roles of the first terminal and the second terminal or information on data transmission direction, and wherein the PSCCH and the PSSCH are received, by the first terminal, based on Rx beamforming, and wherein the Rx beamforming is performed based on the time resource and to a direction of the second terminal determined based on the beam alignment.

7. The method of claim 6, wherein the SL-RNTI of the second terminal is transmitted to the first terminal based on the beam alignment, and wherein the DCI is decoded based on the SL-RNTI of the second terminal.

8. The method of claim 7, wherein the DCI includes a destination ID field.

9. The method of claim 6, wherein the second terminal transmits sidelink unicast connection information related to the beam alignment to the base station, and wherein the DCI is decoded based on the sidelink connection specific ID related to the beam alignment.

10. The method of claim 6, wherein the DCI is decoded based on a common RNTI, and wherein the DCI includes a source ID field and a destination ID field.

11. The method of claim 6, wherein a media access control control element (MAC CE) of the SL-BSR includes location information of the second terminal and transmission direction information of the second terminal.

12. The method of claim 11, wherein the location information of the second terminal is based on a zone ID.

13. A first terminal in a wireless communication system, the first terminal comprising:
a transceiver; and
a processor coupled with the transceiver,
wherein the processor is configured to:
transmit a sidelink synchronization signal (SLSS) to a second terminal, wherein the SLSS includes a primary sidelink synchronization signal (PSSS) and a secondary sidelink synchronization signal (SSSS),
perform a beam alignment a connection with the second terminal based on information related to a beam alignment,
control the transceiver to receive downlink control information (DCI) related to the second terminal from a base station, wherein the DCI is decoded based on at least one of a sidelink-radio network temporary identifier (SL-RNTI) of the second terminal or a sidelink connection specific ID,
control the transceiver to obtain, from the DCI, information on a time resource for transmitting a physical sidelink control channel (PSCCH) and a physical sidelink shared channel (PSSCH) by the second terminal, and
control the transceiver to receive the PSCCH and the PSSCH from the second terminal based on the DCI, wherein the sidelink connection specific ID includes at least one of information on roles of the first terminal and the second terminal or information on data transmission direction, and wherein the PSCCH and the PSSCH are received based on Rx beamforming, and wherein the Rx beamforming is performed based on the time resource and to a direction of the second terminal determined based on the beam alignment.

14. A second terminal in a wireless communication system, the second terminal comprising:
a transceiver; and
a processor coupled with the transceiver,
wherein the processor is configured to:
receive a sidelink synchronization signal (SLSS) from a second terminal, wherein the SLSS includes a primary sidelink synchronization signal (PSSS) and a secondary sidelink synchronization signal (SSSS),
perform a beam alignment a connection with a first terminal based on information related to a beam alignment,
control the transceiver to transmit a sidelink scheduling request (SL-SR) and a sidelink buffer status report (SL-BSR) to a base station,
control the transceiver to receive downlink control information (DCI) related to the second terminal from the base station, wherein the DCI is decoded based on at least one of a sidelink-radio network temporary identifier (SL-RNTI) of the second terminal or a sidelink connection specific ID, and
control the transceiver to transmit a physical sidelink control channel (PSCCH) and a physical sidelink shared channel (PSSCH) to the first terminal using a time resource indicated by the DCI, wherein the sidelink connection specific ID includes at least one of information on role of the first terminal and the second terminal or information on data transmission direction, wherein the PSCCH and the PSSCH are received, by the first terminal, based on Rx beamforming, and wherein the Rx beamforming is performed based on the time resource and to a direction of the second terminal determined based on the beam alignment.

15. A device comprising at least one memory and at least one processor functionally coupled with the at least one memory,
wherein the at least one processor is configured to control the device to:
transmit a sidelink synchronization signal (SLSS) to a sidelink transmission terminal,
wherein the SLSS includes a primary sidelink synchronization signal (PSSS) and a secondary sidelink synchronization signal (SSSS),
perform a connection a beam alignment with the sidelink transmission terminal based on information related to a beam alignment,
receive downlink control information (DCI) related to the sidelink transmission terminal from a base station, wherein the DCI is decoded based on at least one of a sidelink-radio network temporary identifier (SL-RNTI) of the sidelink transmission terminal or a sidelink connection specific ID,
obtain, from the DCI, information on a time resource for transmitting a physical sidelink control channel (PSCCH) and a physical sidelink shared channel (PSSCH) by the sidelink transmission terminal; and receive a physical sidelink control channel (PSCCH) and a physical sidelink shared channel (PSSCH) from the sidelink transmission terminal based on the DCI, wherein the sidelink connection specific ID includes at least one of information on roles of the device and the sidelink transmission terminal or information on data transmission direction, wherein the PSCCH and the PSSCH are received based on Rx beamforming, and wherein the Rx beamforming is performed based on the time resource and to a direction of the sidelink transmission terminal determined based on the beam alignment.

16. A non-transitory computer-readable medium storing at least one instruction, comprising the at least one instruction that is executable by a processor, wherein the at least one instruction instructs the computer-readable medium to:

transmit a sidelink synchronization signal (SLSS) to a sidelink transmission terminal, wherein the SLSS includes a primary sidelink synchronization signal (PSSS) and a secondary sidelink synchronization signal (SSSS), perform a connection a beam alignment with the sidelink transmission terminal based on information related to a beam alignment, receive downlink control information (DCI) related to the sidelink transmission terminal from a base station, wherein the DCI is decoded based on at least one of a sidelink-radio network temporary identifier (SL-RNTI) of the sidelink transmission terminal or a sidelink connection specific ID, obtaining, from the DCI, information on a time resource for transmitting a physical sidelink control channel (PSCCH) and a physical sidelink shared channel (PSSCH) by the sidelink transmission terminal, and receive a physical sidelink control channel (PSCCH) and a physical sidelink shared channel (PSSCH) from the sidelink transmission terminal based on the DCI, wherein the sidelink connection specific ID includes at least one of information on roles of the computer-readable medium and the sidelink transmission terminal or information on data transmission direction, wherein the PSCCH and the PSSCH are received based on Rx beamforming, and wherein the Rx beamforming is performed based on the time resource and to a direction of the sidelink transmission terminal determined based on the beam alignment.

* * * * *